United States Patent
Metzler et al.

(10) Patent No.: US 10,382,789 B2
(45) Date of Patent: Aug. 13, 2019

(54) SYSTEMS AND METHODS FOR DIGITAL MEDIA COMPRESSION AND RECOMPRESSION

(71) Applicant: BOARD OF REGENTS, THE UNIVERSITY OF TEXAS SYSTEM, Austin, TX (US)

(72) Inventors: Richard E. L. Metzler, San Antonio, TX (US); Sos S. Agaian, San Antonio, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 494 days.

(21) Appl. No.: 14/773,023

(22) PCT Filed: Mar. 7, 2014

(86) PCT No.: PCT/US2014/021931
§ 371 (c)(1),
(2) Date: Sep. 4, 2015

(87) PCT Pub. No.: WO2014/138633
PCT Pub. Date: Sep. 12, 2014

(65) Prior Publication Data
US 2016/0021396 A1    Jan. 21, 2016

Related U.S. Application Data

(60) Provisional application No. 61/775,104, filed on Mar. 8, 2013.

(51) Int. Cl.
*G06T 9/40* (2006.01)
*G06T 7/262* (2017.01)
(Continued)

(52) U.S. Cl.
CPC .......... *H04N 19/625* (2014.11); *G06T 7/262* (2017.01); *G06T 9/40* (2013.01); *H04N 19/40* (2014.11);
(Continued)

(58) Field of Classification Search
None
See application file for complete search history.

(56) References Cited

U.S. PATENT DOCUMENTS 5,956,426 A    9/1999  Matsuura et al.
6,009,435 A    12/1999 Taubin et al.
(Continued)

OTHER PUBLICATIONS

International Search Report & Written Opinion, Application No. PCT/US14/21931, dated Sep. 10, 2014, 16 pages.
(Continued)

*Primary Examiner* — William C Vaughn, Jr.
*Assistant Examiner* — Lindsay J Uhl
(74) *Attorney, Agent, or Firm* — Meyertons, Hood, Kivlin, Kowert & Goetzel, P.C.; Mark R. DeLuca

(57) ABSTRACT

Adaptive methods and apparatuses include compressing, recompressing, decompressing, and transmitting/storing digitized media data, such as text, audio, image, and video. Methods may include partitioning data; transforming partitioned data; analyzing partitioned data; organizing partitioned data; predicting partitioned data; partially or fully encoding partitioned data partially or fully decoding partitioned data, and partially or fully restructuring the original data.

16 Claims, 14 Drawing Sheets

(51) Int. Cl.
  *H04N 19/40* (2014.01)
  *H04N 19/48* (2014.01)
  *H04N 19/61* (2014.01)
  *H04N 19/96* (2014.01)
  *H04N 19/625* (2014.01)

(52) U.S. Cl.
  CPC ............. *H04N 19/48* (2014.11); *H04N 19/61* (2014.11); *H04N 19/96* (2014.11)

(56) References Cited

U.S. PATENT DOCUMENTS

| | | | |
|---|---|---|---|
| 6,072,830 | A | 6/2000 | Proctor et al. |
| 7,123,656 | B1 | 10/2006 | Reznik |
| 2005/0273790 | A1 | 12/2005 | Kearney, III et al. |
| 2006/0233257 | A1* | 10/2006 | Keith .................... G06F 17/148 375/240.19 |
| 2007/0250522 | A1 | 10/2007 | Perrizo |
| 2008/0101709 | A1 | 5/2008 | Guleryuz et al. |
| 2009/0046941 | A1* | 2/2009 | Mietens ............... H04N 19/176 382/250 |
| 2009/0074308 | A1* | 3/2009 | Sasaki .................. H04N 19/426 382/232 |
| 2009/0083279 | A1 | 3/2009 | Hasek |
| 2010/0310185 | A1* | 12/2010 | Liu ....................... H04N 19/119 382/239 |
| 2012/0073824 | A1 | 3/2012 | Routh et al. |
| 2012/0201475 | A1 | 8/2012 | Carmel et al. |
| 2013/0272423 | A1* | 10/2013 | Chien .................. H04N 19/176 375/240.18 |

OTHER PUBLICATIONS

International Preliminary Report on Patentability, Application No. PCT/US2014/021931, dated Sep. 10, 2014, 10 pages.

Bauermann et al., "Further Lossless Compression of JPEG Images", 5 pages, 2004, Institute of Communication Networks, Technische Universitat Munchen, Munich, Germany. [accessed Jul. 11, 2016].

Matsuda et al., "Lossless Re-encoding of JPEG Images Using Block-Adaptive Intra Prediction", 16th European Signal Processing Conference, Aug. 25-29, 2008, 5 pages, Department of Electrical Engineering, Faculty of Science and Technology, Science University of Tokyo.

Ponomarenko et al., "Additional Lossless Compression of JPEG Images," Proceedings of the 4th International Symposium on Image and Signal Processing and Analysis, 4 pages, Sep. 15-17, 2005, Tampere, Finland.

Stirner et al., "Improved Redundancy Reduction for JPEG Files", Picture Coding Symposium 2007, Nov. 7-9, 2007, 4 pages, Lisbon, Portugal.

Huffman, "A Method for the Construction of Minimum-Redundancy Codes", Proceedings of the I.R.E., 4 pages, Sep. 1952.

J. Rissanen, "A Universal Data Compression System," IEEE Transactions on Information Theory, 9 pages, Sep. 1983, vol. IT-29, No. 5.

Begleiter et al., "On Prediction Using Variable Order Markov Models," Journal of Artificial Intelligence Research 22, 37 pages, published Dec. 2004.

C. Bloom, "Solving the Problems of Context Modeling", California Institute of Technology, 11 pages, Mar. 1998, Pasadena, CA.

Cleary et al., "Unbounded Length Contexts for PPM", presented at the Data Compression Conference, Mar. 28-30, 1995, 9 pages, The Computer Journal, vol. 40, No. 2/3.

Willems et al., "The Context Tree Weighting Method: Basic Properties", IEEE Transactions on Information Theory, May 1995, 22 pages, vol. 41.

Savari, "Redundancy of the Lempel-Ziv Incremental Parsing Rule", IEEE Transactions on Information Theory, 13 pages, Jan. 1997, vol. 43, No. 1.

Gasthaus et al., "Improvements to the Sequence Memoizer", Advances in Neural Information Processing Systems 23: 24th Annual Conference on Neural Information Processing Systems 2010, 9 pages, Dec. 6-9, 2010, Vancouver, British Columbia, Canada.

Gasthaus et al., "Lossless Compression Based on the Sequence Memoizer", presented at the 2010 Data compression Conference, 10 pages, Mar. 24-26, 2010, Snowbird, UT, USA.

* cited by examiner $$\begin{bmatrix} 1 & 9 & 17 & 25 & 33 & 41 & 49 & 57 \\ 2 & 10 & 18 & 26 & 34 & 42 & 50 & 58 \\ 3 & 11 & 19 & 27 & 35 & 43 & 51 & 59 \\ 4 & 12 & 20 & 28 & 36 & 44 & 52 & 60 \\ 5 & 13 & 21 & 29 & 37 & 45 & 53 & 61 \\ 6 & 14 & 22 & 30 & 38 & 46 & 54 & 62 \\ 7 & 15 & 23 & 31 & 39 & 47 & 55 & 63 \\ 8 & 16 & 24 & 32 & 40 & 48 & 56 & 64 \end{bmatrix}$$

SYSTEMS AND METHODS FOR DIGITAL MEDIA COMPRESSION AND RECOMPRESSION

STATEMENT REGARDING FEDERALLY SPONSORED RESEARCH OR DEVELOPMENT

This invention was made with government support from the National Science Foundation and the Center for Simulation, Visualization, and Real-Time Prediction. The U.S. Government has certain rights to this invention.

BACKGROUND OF THE INVENTION

1. Field of the Invention

The invention relates to algorithmic procedures for compressing, recompressing and decompressing digital media. More specifically, the invention relates to automated data sequencing, modeling encoding and decoding for converting media types such as text, audio, image, and video originally stored in an uncompressed or compressed formats such as bitmap, MP3, JPEG, or MPEG into a new compressed format. In a more particular embodiment, the invention includes both: the sequential and progressive compressing/recompressing and decompressing modes.

2. Description of the Relevant Art

Media formats specify how a type of file should be packaged. Specifically, formats specify how information describing a file should be represented as digital data. Often, formats describing files containing large amounts of data include a method for which to compress the file and to decompress it. This minimizes the amount of data needed to contain the file by removing extraneous information and statistical redundancies. In turn, this allows for more efficient transfer of the file from hard drives to memory and back, or over communications networks.

In particular, digital audio and visual media necessarily contain large amounts of data due to the fact that they should provide the perception of smooth, continuous input to human sensory systems despite the inherent granularity of a digital representation. Fortunately, human perception is not adept at distinguishing subtle variations in sensory signals. This allows digital representations of sensory data to be compressed lossily by discarding or smoothing over data which is not easy for a human to perceive. Smoothing is especially effective if data is highly correlated as small structural changes will not be apparent.

Furthermore, highly correlated data implies that if a portion of that data be removed, it is possible to estimate and reinsert that portion of the data. The task of lossy compression is to locate and discard data which can be adequately estimated using some method.

Some of the most successful lossy compression algorithms utilize one or another types of reversible (or nearly-reversible) decorrelating transforms on successive partitions of data. The purpose of a transform is to re-represent each partition of data in such a way that correlated information is concentrated into certain regions of the transform domain while less correlated data is spread into other regions of the transform domain. Thus, an effective transform "decorrelates" data into a sparser representation. If the transform is properly chosen to decorrelate a partition of interest, then the majority of the relevant partition information is concentrated into only a few regions of the transform domain. By intelligently discarding or smoothing regions in the transform domain (usually in quantization steps involving scaling and rounding), the complexity of the underlying data can be reduced while minimally impacting the perceived quality of that underlying data. Reduced complexity simplifies statistical and predictive models which in turn allow for more effective data compression during an entropy encoding stage. Such decorrelating transforms include, but are not limited to, the Karhunen-Loève transform (KLT), the discrete cosine transform (DCT) family, the wavelet transform families and integer transform families which utilize non-linear lifting-schemes.

Older formats like the original JPEG standard for image compression do not generally preserve apparent data fidelity as well as more modern formats at similar compression rates. But some older compression algorithms have endured and in many cases have become de facto digital standards. This is apparent in dominance of JPEG image media over more modern formats. The original JPEG format, released in 1992, was the culmination of two decades of research into linear transform coding and quantization for image compression. Before JPEG, no single standard could obtain low enough bitrates at acceptable quality levels for standard resolution, color images which would allow for efficient storage and distribution of digital, visual media. Since then, newer proprietary formats along with JPEG-LS, JPEG-2000, and the JPEG-XR format have sought to increase the coding efficiency of the original JPEG algorithm while simultaneously enhancing its feature set. However, the new formats have failed to gain widespread acceptance by most users due to a number of factors. These factors may include: a) the new formats may be computationally demanding and require faster computers to support a pleasant user experience; b) the new formats may not add much compression performance over the original JPEG standard; c) the new formats may not add substantial visual improvement at comparable bit rates to the original JPEG standard; d) JPEG format pictures may already be in wide distribution; e) use of the JPEG standard does not incur licensing fees; f) transcoding of already-compressed JPEG images into more advanced lossy format may result in poor image quality; and g) transcoding of already-compressed JPEG images into more advanced lossless format may not result in a significantly smaller file size. Even so, the JPEG standard is 20 years old and offers inferior bit rates at comparable quality to more modern formats.

SUMMARY

Methods and systems for compression and decompression of media are described. In some embodiments, compression methods losslessly or lossily alter the inherent data of the media while providing superior compression performance compared to the original format. In certain embodiments, digital data that has already-compressed is recompressed using a block decorrelating algorithm. JPEG media is one example of media employing a block compression algorithm to which recompression may be applied.

In various embodiments, methods and systems are described for adaptively compressing, recompressing, decompressing, and transmitting digitized multimedia data. Methods may include partitioning data; transforming partitioned data; analyzing partitioned data; organizing partitioned data, predicting partitioned data; partially or fully encoding partitioned data; partially or fully decoding partitioned data; and partially or fully restructuring the original data.

In one embodiment, JPEG media is further compressed without introducing extra losses. In another embodiment, various access profiles are utilized to assist in compressing data at different compression rates. In other embodiments, available portions of compressed data are progressively decompressed, allowing for continuous restructuring of the original, uncompressed data as more compressed data becomes available. In addition, unavailable portions of data may be predicted, (which may support even higher quality approximations of the original data when only partial data is available). In the case when unavailable data is predicted, this type of decoding may be referred to as "generative" instead of "progressive."

In some embodiments, encoding procedures enable lossless recompression of original JPEGs to formats that provide improved compression performance, comparable to those of more modern formats. The methods described herein also apply to other media formats, such as MPEG-1 and MPEG-2 audio, MPEG-1 and MPEG-2 video, and may be further applicable to modern and future formats such as the JPEG-XR image formats and HEVC video formats.

In some embodiments, methods for generating new compression formats are losslessly transcodable to and from other formats like JPEG. Formats may be perfectly transcodable back to the originals, and, as such, may be robust to the quality degradation that may result from transcoding into a lossy format.

In various embodiments, systems and methods have the ability to
losslessly compress digital media at relatively high compression ratios, thereby minimizing file storage and transportation costs,
transcode to and from a traditional format and a new format without ever fully decompressing the original file,
lossily compress media to target bit rates while retaining data fidelity,
decompress partially available code (e.g., progressive support), and
predict unavailable code (e.g., generative support).

In an embodiment, a computer-implemented method includes transforming media into a representation including sets of quantized coefficients. Correlation measures between quantized coefficients in the sets of quantized coefficients are computed. One or more models are constructed based on the correlation measures. One or more models are constructed based on at least a portion of the quantized coefficients. The coefficient data is encoded to compress the media according to at least one of the models.

In an embodiment, a system includes a processor and a memory coupled to the processor. The memory stores program instructions executable by the processor to implement a method that includes transforming media into a representation including sets of quantized coefficients. Correlation measures between quantized coefficients in the sets of quantized coefficients are computed. One or more models are constructed based on the correlation measures. One or more models are constructed based on at least a portion of the quantized coefficients. The coefficient data is encoded to compress the media according to at least one of the models.

In an embodiment, a tangible, computer readable medium includes program instructions are computer-executable to implement a method that includes transforming media into a representation including sets of quantized coefficients. Correlation measures between quantized coefficients in the sets of quantized coefficients are computed. One or more models are constructed based on the correlation measures. One or more models are constructed based on at least a portion of the quantized coefficients. The coefficient data is encoded to compress the media according to at least one of the models.

In one embodiment, a computational device transforms uncompressed media into a representation including various sets of quantized coefficients. Correlation measures between quantized coefficients within the sets are then computed. One or more statistical models of the sets are constructed based on at least a portion of the correlations. Finally, the coefficient data is statistically encoded (e.g. compressed) according to at least a portion of one or more of the models.

In some embodiments, a scan tree of coefficients is adapted from coefficient correlation statistics. The scan tree may include an ordered, linked-list of coefficient types arranged by their mutual information and relative magnitudes. One skilled in the art will realize that other combinations of correlation measures other than mutual information and relative magnitude may be employed to construct such a tree. Furthermore, linked graph structures or networks other than a tree may also be used to organize coefficient correlations. A bit structure derived from the scan tree may be used to determine a sequence of significance passes, determining the progressive ordering for which the data is to be encoded. The significance pass ordering need not necessarily proceed one coefficient type at a time. Rather, the most significant, unprocessed bit type across all coefficients may be processed in each pass.

In one embodiment, a scheme, system, and method for lossless JPEG recompression is implemented on a computational device. The original JPEG is first partially decoded into quantized transform coefficients. The framework detects, organizes, and models various types of correlations (including, sign, magnitude, and mutual information correlations) between quantized discrete cosine transform (DCT) coefficients. This model provides information about the best way to compress the data in a progressive fashion. Specifically, the model reorganizes data in such a way that it is both more predictable and descends in informational significance. A predictor and an entropy encoder may be used to compress the data into a smaller number of bits. The encoded data may be losslessly decoded back into the uncompressed representation.

In another embodiment, a scheme, system, and method for lossless JPEG recompression is implemented on a computational device. The original JPEG is first partially decoded into quantized transform coefficients. The framework detects, organizes, and models various types of correlations (possibly including, sign, magnitude, and mutual information correlations) between quantized discrete cosine transform (DCT) coefficients. This model provides information about the best way to compress the data in a progressive fashion. Specifically, the model reorganizes data in such a way that it is both more predictable and descends in informational significance. A predictor and an entropy encoder may be used to compress as much of the most significant data into a target number of bits. The encoded data may be losslessly decoded back into the original amount of significant data. The remaining data (which was lost during lossy compression) may be estimated and replaced using the statistical prediction models built during decoding.

In other embodiments, schemes, systems, and methods for lossless media recompression of digital media which were originally compressed using a block transform are provided. An original compressed media file is first partially decoded into quantized transform coefficients. The framework detects, organizes, and models various types of correlations (possibly including, sign, magnitude, and mutual information correlations) between quantized transform coefficients. This model may provide information about the best way to compress the data in a progressive fashion. Specifically, the model may reorganize data in such a way that it is both more predictable and descends in informational significance. A predictor and an entropy encoder may be used to compress the data into a smaller number of bits. The encoded data may be losslessly decoded back into the uncompressed representation.

In other embodiments, schemes, systems, and methods for lossy recompression of digital media which were originally compressed using a block transform are provided. An original compressed media file is first partially decoded into quantized transform coefficients. The framework detects, organizes, and models various types of correlations (possibly including, sign, magnitude, and mutual information correlations) between quantized transform coefficients. This model may provide information about the best way to compress the data in a progressive fashion. Specifically, the model reorganizes data in such a way that it is both more predictable and descends in informational significance. A predictor and an entropy encoder may be used to compress as much of the most significant data into a target number of bits. The encoded data may be losslessly encoded back into the original amount of significant data. The remaining data (which was lost during lossy compression) may be estimated and replaced using the statistical prediction models built during decoding.

In another embodiment, a scheme, system, and method for lossy media compression is provided. The media is first represented in a quantized transform coefficient structure. The framework detects, organizes, and models various types of correlations (possibly including, sign, magnitude, and mutual information correlations) between quantized transform coefficients. This model may provide information about the best way to compress the data in a progressive fashion. Specifically, the model may reorganize data in such a way that it is both more predictable and descends in informational significance. A predictor and an entropy encoder may be used to compress as much of the most significant data into a target number of bits. The encoded data may be losslessly decoded back into the original amount of significant data. The remaining data (which was lost during lossy compression) may be estimated and replaced using the statistical prediction models built during decoding.

In some embodiments, the compression method algorithm is progressive at the bit level. An algorithm that is compressive at the bit level may allow faster reconstruction of an image given incomplete data. An algorithm such as described herein may, in certain cases, provide 20% to 40% improvement over progressive JPEG at common quality levels. Methods as described herein may be implemented for recompression of any media format that utilizes a block transform to decorrelate local data. Thus, recompression methods adhering to the paradigms described herein may serve as the basis for progressive audio and video where data is instantly available to the user and gradually increases in quality as more data becomes available.

The framework of the systems as described herein includes a diversity of sub-systems. Each sub-system may be used separately or in a combined/fused way. Each system may use a different approach. For instance, one or more sub-systems may utilize inter-block prediction and one or more sub-systems may utilize extra-block prediction.

In one embodiment of a subsystem, methods for data analysis construct a correlation tree based on inter-block coefficient correlations.

In an embodiment of another subsystem, methods for data analysis transform a coefficient block representation into a bit structure based on a correlation tree which elucidates bit correlations and significance within that block.

In an embodiment of another subsystem, methods for data manipulation transform a bit structure back into a coefficient block.

In an embodiment of another subsystem, methods provide prediction of bits within the bit structure of a block.

In an embodiment of another subsystem, methods provide prediction of bits across multiple blocks.

In an embodiment of another subsystem, methods provide losslessly encoding block bits resulting in a representation requiring fewer bits.

In an embodiment of another subsystem, methods provide losslessly decoding a compressed representation back into the original block bits.

In an embodiment of another subsystem, methods provide losslily encoding block bits resulting in a representation requiring fewer bits.

In an embodiment of another subsystem, methods provide losslessly decoding a compressed representation back into a lossy representation of block bits.

In an embodiment of another subsystem, methods provide encoding block bits resulting in an encrypted representation.

In an embodiment of another subsystem, methods provide decoding an encrypted representation back into the original block bits.

In an embodiment of another subsystem, methods provide encoding block bits resulting in a representation which supports error correction.

In an embodiment of another subsystem, methods correct errors detected within an encoded bit stream.

Schemes/frameworks based system and sub-systems as described herein may have many advantages. They may be fast, simple, inexpensive, and provide efficient and robust data packaging for media storage and transfer. The methods and systems can be implemented in hardware or software.

BRIEF DESCRIPTION OF THE DRAWINGS

Advantages of the present invention will become apparent to those skilled in the art with the benefit of the following detailed description of embodiments and upon reference to the accompanying drawings:

FIG. 6 is a possible coefficient enumeration scheme for an 8×8 transform block;

FIG. 10 is a diagram of a coefficient block bit structure based on a scan tree;

Figure 1:
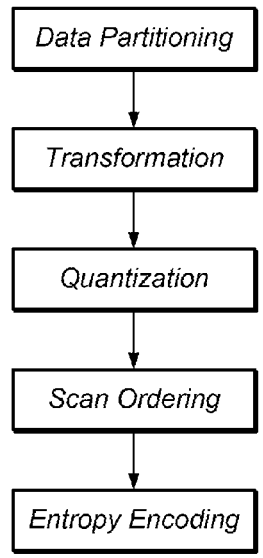
FIG. 1 is a flow diagram of a typical media compression scheme.

While the invention may be malleable to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. The terms "block" or "set" mean a collection of data regardless of size or shape. The term "block" may also refer to one of a sequence of partitions of data. The term "coefficient" may include a singular element from a block of data.

Embodiments herein relate to automated quantitative analysis and implementation of a data compression scheme as it applies to digital media. In addition, embodiments herein relate to modeling, arranging, predicting, and encoding digital data such that the final representation of the data requires fewer bits than a previous representation.

In various embodiments, an encoding scheme for JPEG recompression has the ability to
losslessly compress JPEG media at relatively high compression ratios, thereby minimizing file storage and transportation costs,
transcode back and forth between traditional JPEG files (without ever fully decompressing the image file),
lossily compress JPEG media to target bit rates while retaining image quality,
decompress partially available code (e.g. progressive support), and
predict unavailable code (e.g. generative support).
The encoding schemes described herein are not limited to JPEG. The schemes may be implemented for modes and applications to any digital media format that utilizes decorrelating transforms on blocks of data.

Both general encoding stages and specific encoding stages are described herein. Generally, the entire process of arranging, scanning, and compressing a quantized representation of data is referred to as encoding. However, there is also a specific type of statistical encoding stage called entropy encoding which converts a data representation into a final, compressed binary code.

In some embodiments, the coefficient arranging, scanning and statistical encoding stages sort and pack the coefficient data into the final file structure. The coefficient scanning step comes first, sorting the coefficients into collections of 1-dimensional lists according to a predefined method.

JPEG scanning methods include the sequential and progressive modes. Sequential JPEG generates a 1D list of coefficients from each block. Each list is constructed by zig-zag scanning through a block's quantized coefficients up to an end-of-block (eob) character which designates the location of the last non-zero coefficient in the block. Progressive JPEG, on the other hand, groups a single coefficient type from each block into its own, separate list. Each grouping of coefficients is called a significance pass. The significance passes may follow the zig-zag scan order in coefficient selection under the assumption that earlier coefficient types in the zig-zag scan carry more information about the image than coefficient types later in the zig-zag scan. This allows for progressive decoding during image transmission, where an entire, low quality representation of the image is immediately available after transmission and decoding of the most significant pass, and more and more details are available as more significance passes are received and decoded.

Statistical coding, or entropy coding, is the term for encoding methods which achieve lossless compression through removal of statistical redundancies. This is the final step of JPEG (and most data compression schemes for that matter) and where the most significant compression takes place. In most sequential JPEG implementations, each block list (and eob character) is encoded separately using a Huffman-type entropy encoder. Progressive JPEG encodes one significance pass at a time. Usually, the actual encoding statistics (and results) per coefficient may be identical in between progressive and sequential modes, except that the progressive mode proceeding a different order, processing one coefficient type at a time across each block.

In some cases, statistical updating is used to refine the Huffman tables leading to greater compression. This method may be referred to herein as the optimized JPEG algorithm, since not all progressive JPEG algorithms utilize this feature. Updating of a Huffman table at every step can be computationally taxing. The JPEG standard designates use of arithmetic entropy coding over Huffman entropy coding; however, this feature is not widely supported.

Much of the computational burden in JPEG compression is in the quantization stage. the expense of extra computation in the latter stages is generally warranted. Furthermore, encoding processes may be lossless, introducing no further distortion into an image as in a lossy recompression scheme (i.e. transcoding JPEG into JPEG-2000).

Figure 2:
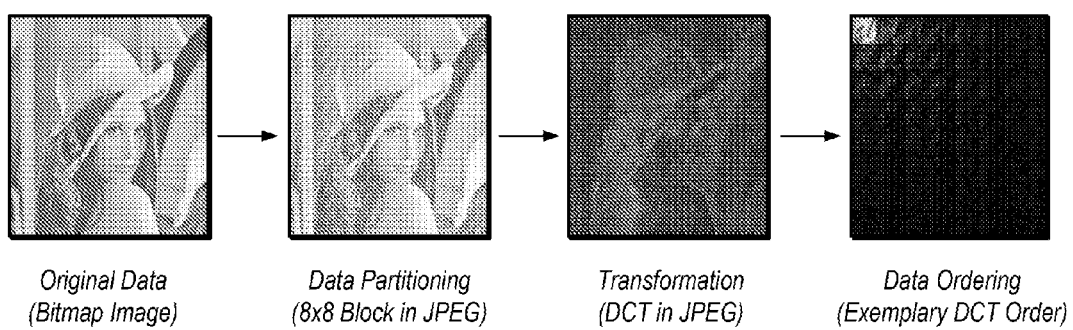
FIG. 2 is an exemplary representation of a block transformed image.
Figure 3:
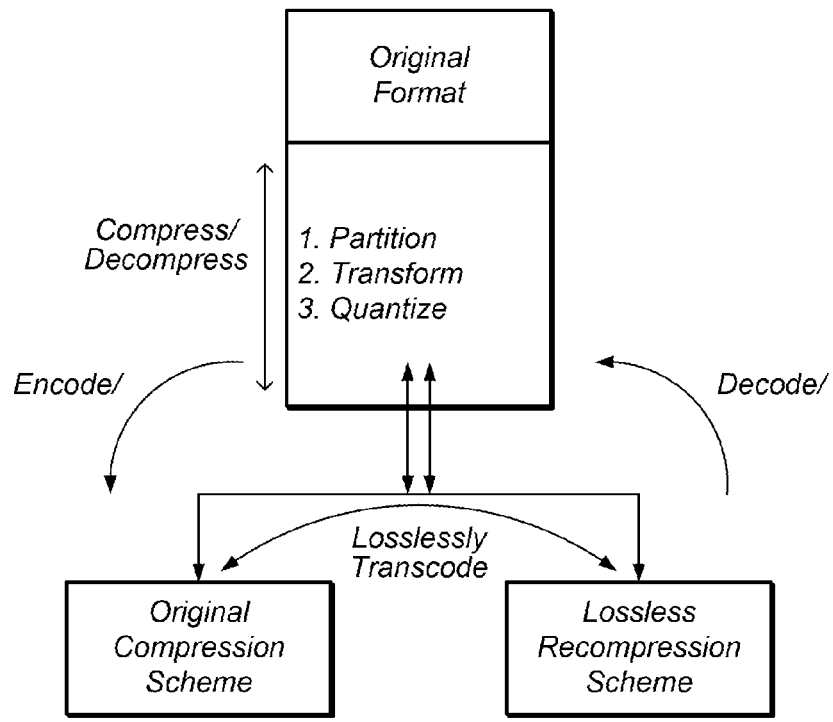
FIG. 3 is a flow diagram of a lossless recompression scheme.
Figure 4:
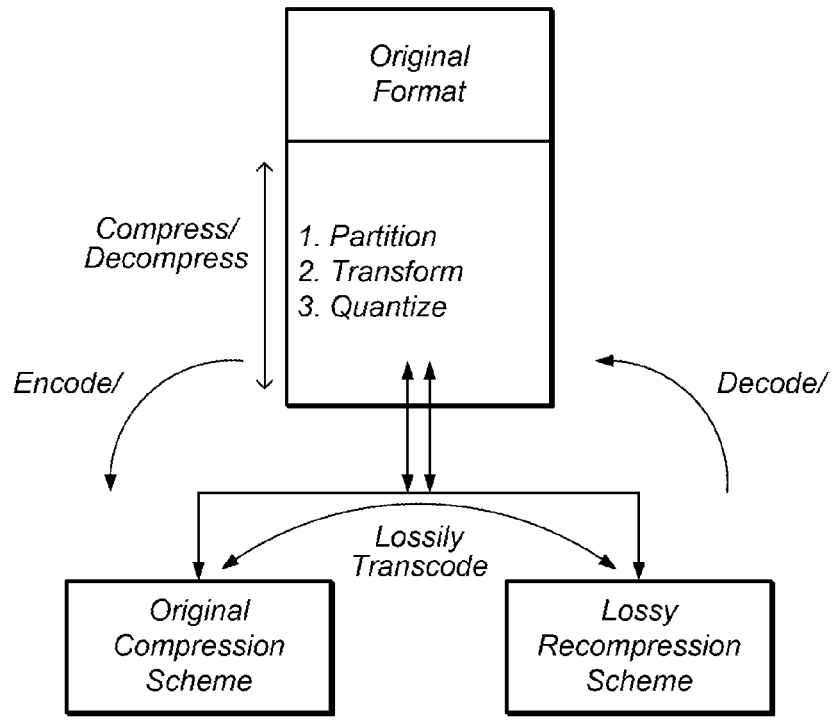
FIG. 4 is a flow diagram of a lossy recompression scheme.

FIG. 1 describes JPEG as originally specified. FIG. 2 shows the result of a block, decorrelating transform. FIGS. 3 and 4 show examples of lossless and lossy recompression schemes, respectively. As illustrated in FIGS. 1-4, an image compressed to a traditional JPEG code may, in some embodiments, be decoded to the quantized DCT coefficients, and recoded by a recompression scheme without full decompression of the compressed image into the spatial domain. Similarly, if one desires to compress an image into a new format, the image may be compressed according to JPEG through to the quantization stage, with the novel coefficient ordering, scanning, and coding methods substituting for the JPEG coefficient scanning and coding methods.

Each step in the modified scheme may be somewhat more complex than the original. In this example, the modified scheme compresses groups of data according to their assumed significance over the entire list of DCT blocks. Also, where progressive JPEG assumes coefficient-type significance according to the zig-zag scan, the recompression algorithm estimates bit-significances based on measured statistics of the image to be compressed or recompressed and stores this information in a significance tree. Thus, the method adapts to a specified image at the quantized coefficient bit level. In some embodiments, the recompression algorithm uses adaptive prediction techniques to exploit adjacent block and coefficient bit similarities and better estimate local coefficient bit statistics. The statistics may be supplied to a specialized SCE arithmetic encoder for simultaneous compression and encryption.

In one embodiment, a recompression scheme proceeds as follows:
1. Rearrange DCT blocks into 1D list using simply connected, Hilbert curves.
2. Difference Code DC coefficients.
3. Convert coefficient values to a least-significant bit, sign-magnitude representation.
4. Delete coefficient types which contribute 0 information.
5. Measure Correlations between remaining coefficient types.
6. Construct a Scan Tree based on coefficient Correlations.
7. Determine Bit Scanning Structure from the Scan Tree and Convert Transform Blocks.
8. Predict and Arithmetically Encode one bit type at a time according to the Bit Structure.
9. Lossy Step: Stop encoding when a desired bit rate is met.
10. Compress and store Scan Tree and First Order Statistics.
Each step in the foregoing embodiment is described more fully below.

Rearrange DCT Blocks into a 1D List.

A sorting order defines a sequential arranging of coefficients from a 2-dimensional transform block such that an encoder can process one coefficient (or coefficient bit) after another. The sorting order may reflect inter-coefficient correlations which prediction methods can exploit to supply local statistics to the entropy encoder which performs the actual, statistical compression. The effect of utilizing local statistics over global statistics is often a substantial increase in the compression performance. Thus, coefficient values may be arranged in a format which maximizes the correlation between adjacent coefficients. In progressive modes, coefficients may be arranged by decreasing significance so that earlier portions decoded data provide as much information as possible. Thus, in this example, the first step in sorting like coefficients is sorting the DCT blocks which contain them. The goal of this first step is to sort like blocks near to each other.

Hilbert curve raster scans are continuously connected, 1-dimensional traversals of square-sided, multidimensional arrays. Traversed samples are tightly correlated in space (on average), much more so than a simple back-and-forth or zig-zag scan. In the case for 2-dimensional transform blocks from an image, a Hilbert curve scans through spatially adjacent transform blocks within a square image. If the image is rectangular in number of transform blocks, then smaller, square tiles can be tessellated upon the image and filled with individual Hilbert curves. The 8 possible Hilbert curves on a square tile provide a means to choose a specific Hilbert curve per tile such that the ends of the curve connect continuously to the ends of an adjacent tile's Hilbert curve. Thus, Hilbert curve raster scans can simply and continuously traverse all transform blocks of a standard-shaped JPEG image. It is also feasible to use other types of space filling curves such as a Peano curve.

A Hilbert curve is a fractally-generated, space-filling curve on integer powers of 2 sided hyper-squares. For example, for every square digital image with sides of $2^p$ (where p is an integer) pixels a Hilbert curve can be constructed which traverses all pixels continuously through adjacent pixels. In fact, 8 unique Hilbert curves can be constructed for square 2D images. The 8 possible Hilbert curves are shown for a 2×2, 4-pixel image in FIG. 5. Of course, for arranging transform blocks, 8×8 coefficient blocks are traversed by the curve instead of the image pixels.

Figure 5:
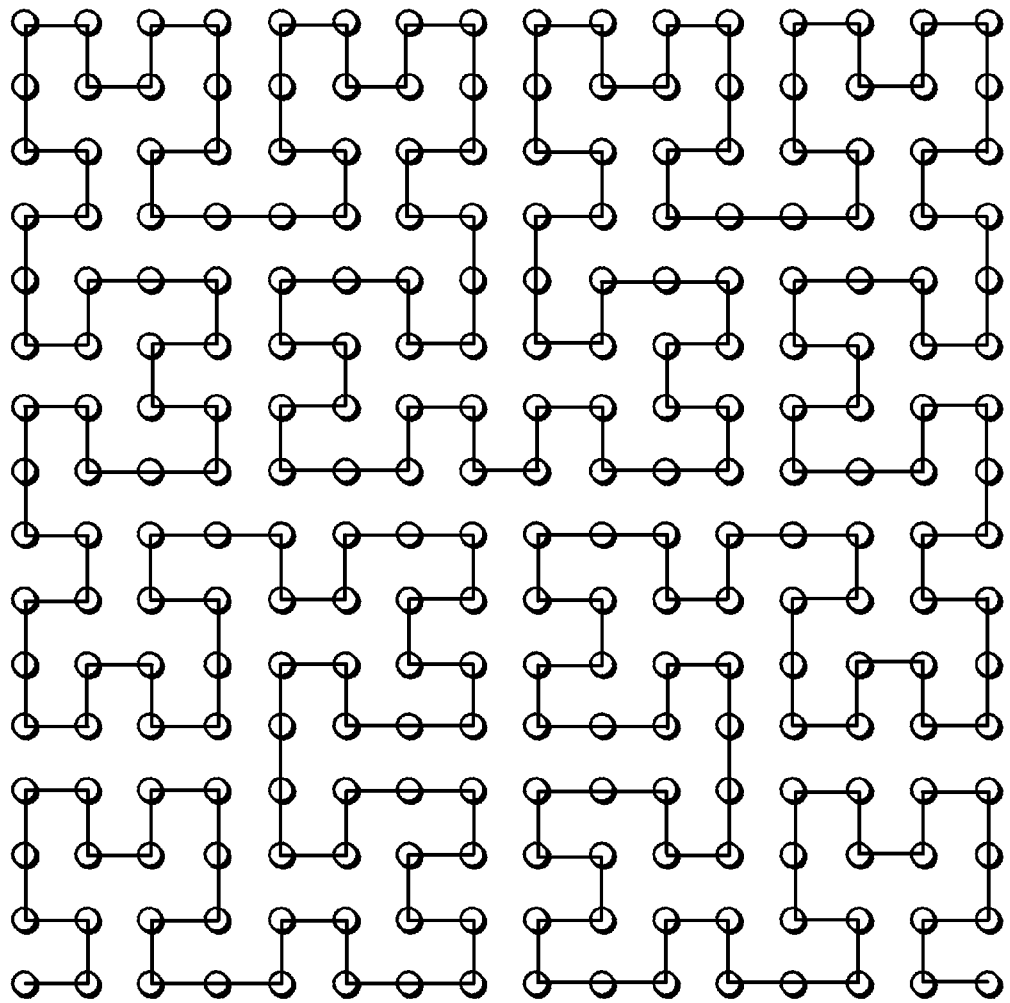
FIG. 5 is a visualization of a space filling curve.

FIG. 5 also shows a 16×16 Hilbert curve, which could be used on a 16×16 block tiling in various embodiments. Because the curve is simply connected and space-filling, each 1D Hilbert curve may create a highly-correlated, localized, sequential context for each image block. The resultant sequences may be well suited for context-based prediction and compression algorithms.

Difference Code DC Coefficients.

The discrete cosine transform, like most transforms used for compression purposes generates one single "DC" coefficient and remaining set "AC" coefficients. The DC coefficient is called borrows the "DC" jargon from "direct current" in electronics engineering. In the context here, DC implies that this coefficient measures the average offset of a block of pixels' values. The alternating, AC, coefficients measure the variation in pixel value about the DC offset. Thus, the DC coefficients measure a distinctly different type of block information than do the AC coefficients. Statistically, this implies that AC coefficients are centered about 0 and the DC coefficients are centered around an image's mean intensity.

JPEG converts the DC coefficients to AC-like coefficients by difference coding adjacent DC coefficients. This elucidates inter-block variance and correlations which often results in an apparent reduction in the DC coefficient entropy throughout an image. This method may also employed in various embodiments of the recompression algorithms described herein. The difference-coded DC coefficients may be encoded in similarly to the AC coefficients, which may simplify the overall implementation.

Convert Coefficient Values into a More Appropriate Representation.

Contextual correlations may be elucidated by representing coefficients in such a way that their correlations are functionally discernible. In general, AC coefficient magnitudes are more correlated than their signs. However, this does not imply that signs are uncorrelated. Inter-coefficient sign-magnitude representations may be handled together. In this manner, even small sign-magnitude correlations may be exploited. Nevertheless, in certain embodiments, sign and magnitude information may be separated before prediction and encoding.

JPEG recompression algorithms described herein may renumerate AC coefficients such that coefficients which differ in sign are separated by 1 and coefficients which differ in magnitude by 1 are separated by 2. Specifically, 0 is mapped to 0, negative integers are mapped to positive odd integers, and positive integers are mapped to positive even integers. (for example, and original coefficient value of 0 is mapped to zero, an original coefficient value of −1 is mapped to 1, and an original coefficient value of 1 is mapped to 2.) This is equivalent to least-significant bit, sign-magnitude representation. Mathematically, the representation v is interchanged with the coefficient value c according to:

$$v = \begin{cases} 0 & c = 0 \\ 2|c| - 1 & c < 0 \\ 2|c| & c > 0 \end{cases}$$

$$c = \begin{cases} 0 & v = 0 \\ -\dfrac{v+1}{2} & v \text{ is odd} \\ \dfrac{v}{2} & v \text{ is even} \end{cases}$$

After difference coding, DC coefficients may be also expressed similarly. Other mapping may be used as appropriate. These may include any of multiple mappings such as: one's complement, two's complement, gray code, or signed integer representation. In some cases, separate signs from magnitude values may be used for separate encoding.

Delete Coefficient Types which do not Contribute to the Decompressed Image.

To save unnecessary computation and storage, coefficients which are 0-valued everywhere can be completely deleted.

Measure Correlations Between Remaining Coefficient Types.

Coefficients within each block may be unwrapped into one or more 1D sequences for definition of significance passes and intra-block coefficient prediction. Because the action of the DCT is to decorrelate an image block, adjacent coefficients are not always strongly correlated. Furthermore, the DCT will not decorrelate all image blocks in the same way (while some blocks may not decorrelate at all). Rather than predefine an assumed optimal coefficient ordering, a structure may in some embodiments be constructed based on correlations observable from the actual image coefficients. Thus, such a method learns transform block statistics, tailoring every compression instance to the specified image. This also makes the method adaptable to any block transform algorithm. Therefore, a recompression algorithm can in some embodiments be applied to recompress images stored in other DCT-based, wavelet-based, or other transform-based formats.

Correlations between coefficients may be summarized in a correlation matrix, where each entry in the matrix represents the correlation of the coefficient enumerated by the $i^{th}$ row to the coefficient enumerated by the $j^{th}$ column. Coefficients may be enumerated column-wise starting at 1. FIG. 6 gives a graphical representation of a possible coefficient enumeration.

Enumeration is also convenient for coefficient referential purposes. For example, the DC coefficient of a particular block may be referred to as "Coefficient 1" and the DC coefficient across all blocks may be referred to as a "Type 1 Coefficient."

For 8×8 DCT coefficient blocks, the full correlation matrix may be 64×64 with the top row corresponding to correlations Coefficient 1. Because 0-valued coefficients can be deleted, however, it may be sufficient to use a smaller coefficient matrix which only contains relevant coefficient types. The diagonal contains self-correlation, which is a measure of dispersion within a coefficient type. A correlation matrix is usually symmetric, implying that the correlation between Coefficient A and Coefficient B is the same as the correlation between Coefficient B and Coefficient A, but this is not necessarily the case for asymmetric correlation measures. In some embodiments, both symmetric and non-symmetric correlation matrices are constructed. For example, the mutual information $I_{A;B}$ between coefficient pairs is used to construct a symmetric correlation matrix I, an asymmetric mutual information correlation matrix J which is just S normalized by the $j^{th}$ coefficient entropy, and a median log magnitude ratio (MLMR) between coefficient pairs to construct an asymmetric correlation matrix K. Each type of matrix is further discussed below.

Other possible types of correlation matrices that may be implemented in various embodiments include, but are not limited to, measures of:
total correlation,
dual total correlation,
interaction correlation,
Kullback-Leibler divergence,
Pearson's product moment coefficient,
or rank correlation coefficients.
In some embodiments, a covariance measure is used instead of a correlation measure.

Magnitude correlations that may be implemented in various embodiments, include:
mean linear magnitude ratio,
median linear magnitude ratio,
mode linear magnitude ratio,
mean logarithmic magnitude ratio,
mode logarithmic magnitude ratio,
The measure may indicate the relative magnitudes at which coefficients are related within a block.

The mutual information between coefficients A and B measures the amount of information in bits they share (on average). Thus, the mutual information gives a measure of how similar coefficients A and B are and is therefore a measure of correlation.

Mathematically, mutual information may be defined as follows. First the 0-order entropy $H_A$ of Coefficient A may be considered, which is the amount of information in bits contained in Coefficient A. The coefficient's statistics may be estimated across all blocks. First, the number of times each value of Coefficient A appears in the image may be counted and stored as a histogram. Next, the histogram may be normalized by dividing by the total number of counts n. Each normalized count is a probability estimate $P_A(v)$ for the occurrence of a certain value v in coefficient A. Then, an estimate for the information entropy of Coefficient A is:

$$H_A = -\sum_{v=0}^{\infty} P_A(v)\log_2(P_A(v))$$

The conditional information entropy $H_{A|B}$ of Coefficient A in a block is estimated after measuring Coefficient B in that same block. Thus, the conditional information gives a measure of how well coefficient A predicts coefficient B and vice versa. To measure the conditional information entropy, the distribution of A values per value of B (in the same block) may be measured, and this entropy per value of B computed. Then, estimating $P_B(v)$ as in Equation 4:

$$H_{A|B} = -\sum_{v=0}^{\infty} P_B(v)\left(-\sum_{w=0}^{\infty} P_{A|B=v}(w)\log_2(P_{A|B=v}(w))\right)$$

$$= \sum_{v=0}^{\infty}\sum_{w=0}^{\infty} P_B(v)P_{A|B=v}(w)\log_2(P_{A|B=v}(w))$$

$$= -\sum_{v=0}^{\infty} P_B(v)H_{A|B=v}$$

This quantity is not necessarily symmetric (e.g. $H_{A|B} \neq H_{B|A}$); however the mutual information is.

The mutual information between A and B is given by:

$$I_{A;B} = H_A - H_{A|B}$$
$$= H_B - H_{B|A}$$
$$= H_{A,B} - H_{A|B} - H_{B|A}.$$

where $H_{A,B}$ is the joint entropy, or the entropy of both distributions if taken as one. Then, the symmetric mutual information correlation matrix I is:

$$I = \begin{bmatrix} I_{1;1} & I_{1;2} & \cdots & I_{1;n} \\ I_{2;1} & I_{2;2} & & \\ \vdots & & \ddots & \\ I_{n;1} & & & I_{n;n} \end{bmatrix}$$

A second, asymmetric mutual information correlation matrix may be employed. This is equivalent to each entry in I divided by the entropy of the $i^{th}$ coefficient which is equal to I(i,i). Thus:

$$J_{A;B} = \frac{I_{A;B}}{H_A} = \frac{H_A - H_{A|B}}{H_A} = 1 - \frac{H_{A|B}}{H_A}$$

$$J_{B;A} = \frac{I_{B;A}}{H_B} = \frac{H_B - H_{B|A}}{H_B} = 1 - \frac{H_{B|A}}{H_B}$$

$$J_{A;B} \neq J_{B;A}$$

$$J = \begin{bmatrix} J_{1;1} & J_{1;2} & \cdots & J_{1;n} \\ J_{2;1} & J_{2;2} & & \\ \vdots & & \ddots & \\ J_{n;1} & & & J_{n;n} \end{bmatrix}$$

In this example, one other type of correlation matrix K may be employed. This matrix measures the scale at which coefficient bits are correlated. For example, comparing the magnitudes of Coefficients A to B, A is correlated at the $K_{A;B}^{th}$ bit. To find $K_{A;B}$, divide the most significant bit level of A divided by the most significant bit level of B for each block and taking the median ratio. There are multiple ways for this correlation may be measured. For example, the rounded median of the most significant bit of the log magnitude ratio be used, based on:

$$K_{A;B} = \text{round}\left(\text{median}\left(\frac{\log_2(A+1)}{\log_2(B+1)}\right)\right)$$
$$= \text{round}(\text{median}(\log_2(A+1) - \log_2(B+1)))$$

$$K_{B;A} = \text{round}\left(\text{median}\left(\frac{\log_2(B+1)}{\log_2(A+1)}\right)\right)$$
$$= \text{round}(\text{median}(\log_2(B+1) - \log_2(A+1)))$$

$$K_{A;B} = -K_{B;A}$$

$$K = \begin{bmatrix} K_{1;1} & K_{1;2} & \cdots & K_{1;n} \\ K_{2;1} & K_{2;2} & & \\ \vdots & & \ddots & \\ K_{n;1} & & & K_{n;n} \end{bmatrix}$$

where $\log_2(A+1)-\log_2(B+1)$ is an array constructed from the difference of Coefficients A and B for each transform block and where $\log_2(0+1)=1$.

Construct a Correlation Tree Based on Coefficient Correlations.

In some embodiments, a structure based on the coefficient type correlations is used to arrange the coefficients into an informational hierarchy. A Scan Tree is constructed of coefficient types linked together according to their correlation. The structure consists of nodes, each representing a particular coefficient type, which branches to correlated coefficient nodes. The hierarchy is such that the top node represents the coefficient type which best predicts (e.g. is most correlated to) all the other coefficients. Its children, which are the nodes to which a parent node branches, represent the nodes for which the parent node is the best predictor (e.g. for which the parent is the most correlated coefficient). This implies that connected coefficients are related by the Markov property and can be predicted using a suitable Markov predictor, and thus one can consider the scan tree a type of hierarchical Markov tree model (HMC) as introduced in this document. Note that an HMC might be created from any set of data, and in this particular embodiment it is used as a scan tree.

Figure 7:
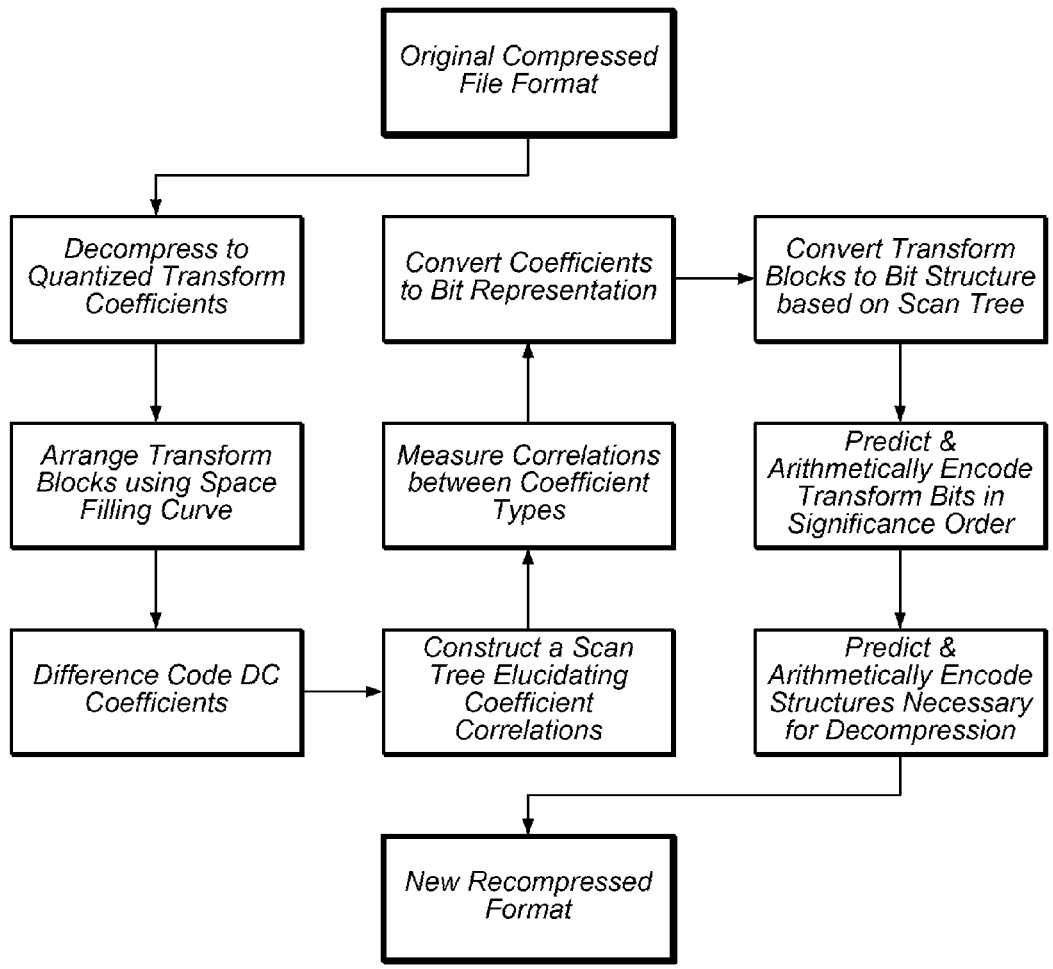
FIG. 7 is a detailed flow diagram of an exemplary lossless recompression scheme.
Figure 8:
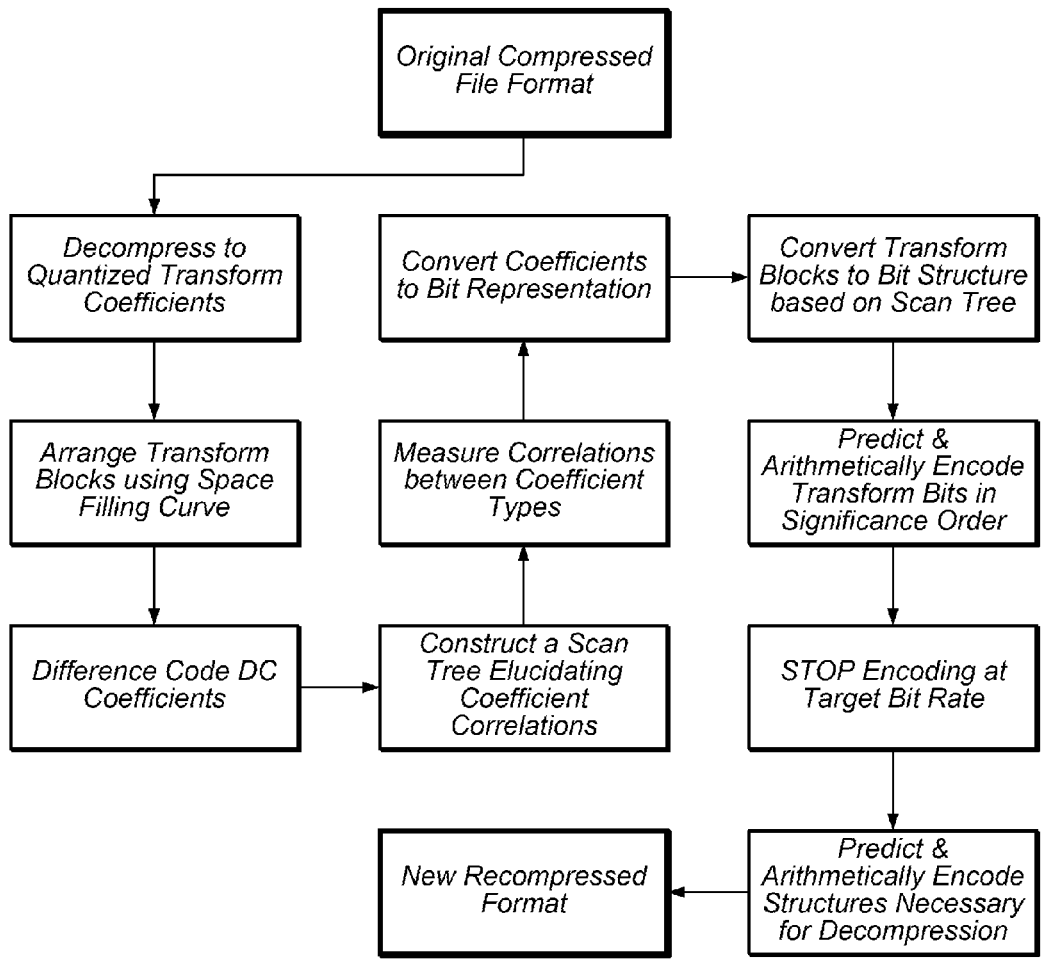
FIG. 8 is a detailed flow diagram of an exemplary lossy recompression scheme.
Figure 9:
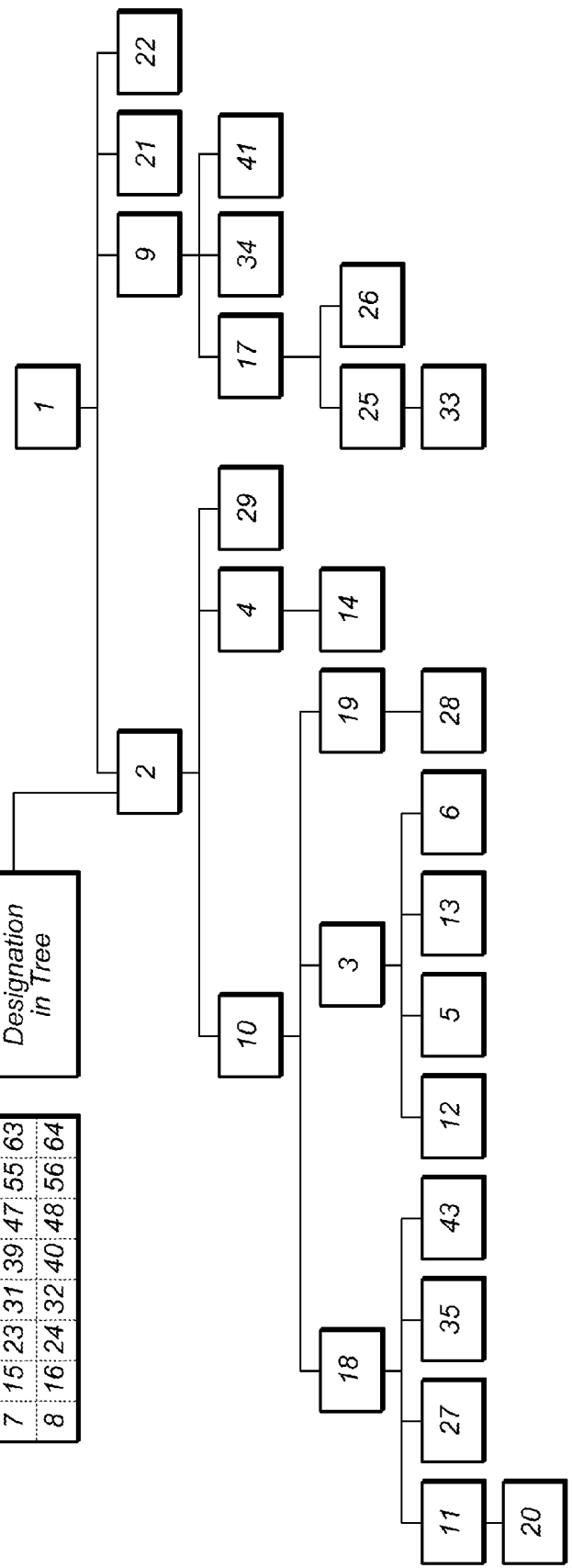
FIG. 9 is a diagram of a scan tree built according to coefficient correlations.

FIG. 7 is a detailed flow diagram of an exemplary lossless recompression scheme including construction of a scan tree;

FIG. 8 is a detailed flow diagram of an exemplary lossy recompression scheme including construction of a scan tree;

An example scan tree might look something like that in FIG. 9. One embodiment is described below.

The algorithm used to construct this tree may be broken down into three primary steps:

1. Construct scan_list, a list of coefficients in decreasing total correlation.
2. Construct pre_tree, a preliminary tree which connects a coefficients to their optimal parent
3. Determine coefficient significance ordering sig_list.

To construct the scan_list, the coefficient type which provides the most mutual information to the rest of the coefficient types may be taken. To determine this, each row of a copy of I may be summed and the coefficient corresponding to the row with the largest sum chosen. After selection of the first coefficient in scan_list, all entries in the copy of I corresponding to this coefficient may be set to 0. Next, the second coefficient in scan_list: may be found, the rows of the copy of I summed, the coefficient whose row has the greatest sum chosen, and its entries in the copy of I set to 0. These steps may be performed until every non-zero coefficient type is entered into scan_list.

Next, the preliminary tree pre_tree may be constructed. An array of nodes for each coefficient in scan_list may be initialized. Each node structure may contain multiple information about the node, including:

the coefficient designation,
the number of bits needed to represent the coefficient's dynamic range in uncompressed form,
the bit correlation of the coefficient to its parent (taken from the K matrix),
the coefficient's child nodes and coefficients,
the coefficient's parent node and coefficient,
an extra information field which contains the amount of information in a coefficient not found within another coefficient,
and the branch information which represents the total amount of information in bits which this coefficient shares with its posterity.

This preliminary tree may be an inefficient structure (e.g. storing both parents and children in each node is redundant). However, the structure is convenient. Later in the algorithm, the structure may be transformed into a more efficient final representation—the scan tree tree_struct.

The preliminary tree is constructed from the bottom up. Following scan_list in reverse order, the optimal parent is found for each coefficient in the list which is determinable from the largest mutual information entry in its row of I other than its own. The column where the maximal mutual information is found corresponds to the optimal parent. The current node is linked to optimal parent node by adding it to the parent node's child field. The optimal parent node is linked to the current node by adding it to the current node's parent field. The bit field and the bit correlation field are updated with the appropriate value between parent and child from the K matrix. The extra information field is updated with the information entropy of the coefficient (available on the diagonal of I) minus the mutual information between the current coefficient and parent (also found in I). The branch information field is set to this amount, although this field will get updated later.

The previous coefficient in scan_list is linked to its optimal parent. The node fields are filled appropriately. After all coefficient types in scan_list are processed, the links and nodes may form a single tree structure with the first coefficient entry in scan_list corresponding to the apex node (which should not have a parent node). Special care may be taken to prevent loops, where links form rings of correlated coefficients which link head to tail and do not attach to the rest of the tree structure. Loops may be checked for continually throughout the tree construction process. If a loop is detected, a next best parent may be selected until the loop is broken.

The last step to forming the tree structure may involve filling the branch information fields of the preliminary tree nodes and defining the significance ordering of the transform coefficient types. Again moving backwards through the coefficients in scan_list, for each coefficient:
1. Save the quantity from the current node's extra information field.
2. Follow the parent links up to the apex of the tree.
3. As each parent is traversed, add the saved quantity from the extra information field to the branch information field of the parent node.
4. Repeat this process for the previous coefficient node in scan_list until all nodes are processed.
Finally, each node will have a branch information field corresponding to the amount of information it and its posterity contain down the tree. The most significant coefficients correspond to the nodes whose branches contain the most non-predictable information about the image. Thus, to construct the coefficient significance ordering, the coefficients may be sorted by the branch information fields of their corresponding nodes in descending order. The final tree structure may be sent along with the recompressed image for proper reconstruction, and so may be re-represented in a more efficient data structure. Thus, only the amount of information necessary to reconstruct the preliminary tree may need to be sent. This includes the coefficient designation fields, either the parent or children fields, and the bit correlation field. The number of uncompressed bits per coefficient also needs to be saved; however, this information is saved in histograms which may also be sent along with the compressed image bits.

Determine the Bit Scanning Structure from the Scan Tree and Convert Transform Blocks.

Once the scan tree is created and the coefficient significance order determined, then the individual coefficient bit significances can also be determined. This is summarized in a bit scanning structure which can be generated by the final tree structure. The bit scanning structure is also a convenient format for the actual entropy encoding process which performs the compression. In previous steps, the coefficients were re-represented in a positive integer format, and the bit representation is the ordinary bit representation of this integer. Thus, once the proper bit structure is determined, all transform blocks can be losslessly converted into the structure.

In some embodiments, block coefficient bits are ordered by significance for entropy coding. Such an arrangement may be advantageous for a number of reasons. First, during the decoding phase, only a portion of the more significant bits may need to be decoded to generate a high quality image. Secondly, if lossy compression is desired to a target bit rate, bits can be encoded from the most to least significant with encoding terminating once the target bit rate has been matched. By coding the most significant bits first, visual distortions due to the lossy encoding may be minimized Thirdly, sequences of bits of a specific significance tend to exhibit similar statistics, allowing prediction algorithms to function more efficiently for such a sequence. This results in better compression rates when compressing with an entropy encoder. (Also, the entropy encoder complexity is minimized because it only has to support a binary alphabet with binary arithmetic which is efficient on typically-encountered computational systems.)

Figure 10:
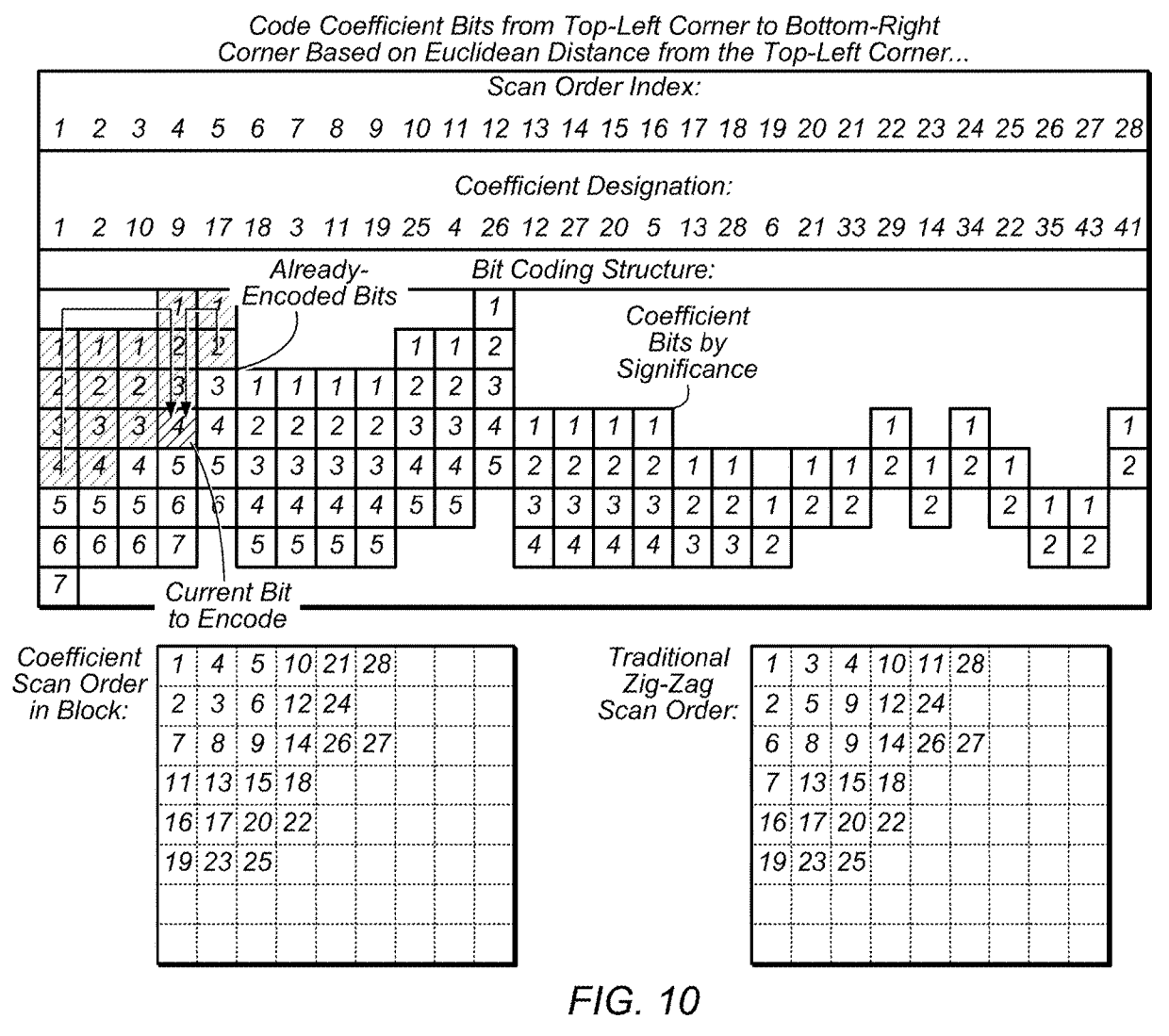

FIG. 10 provides a representation of bit significances according to the coefficient bit representation values found in FIG. 9. Each column contains a single coefficient's bits in decreasing significance from top to bottom. Each row is a collection of bits of similar significance but from different coefficients. The ordering of coefficients in the table (from left to right) may conform to the scan order of significant coefficients as computed by the scan tree (also see FIG. 9). Upward and downward shifts in the bit representation may correspond to the median magnitude correlation between a coefficient and question and its parent coefficient.

Figure 11:
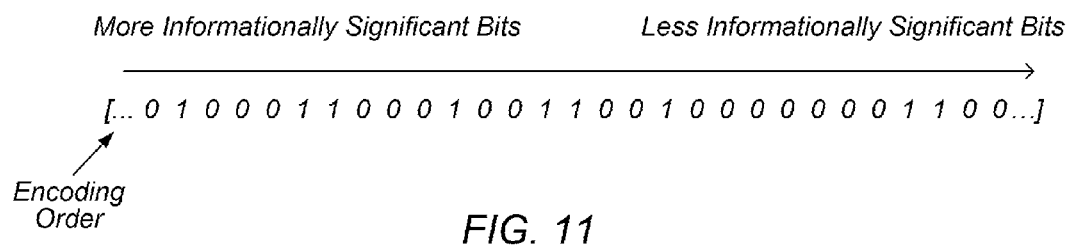
FIG. 11 is a diagram of a progressive encoding scheme.
Figure 12:
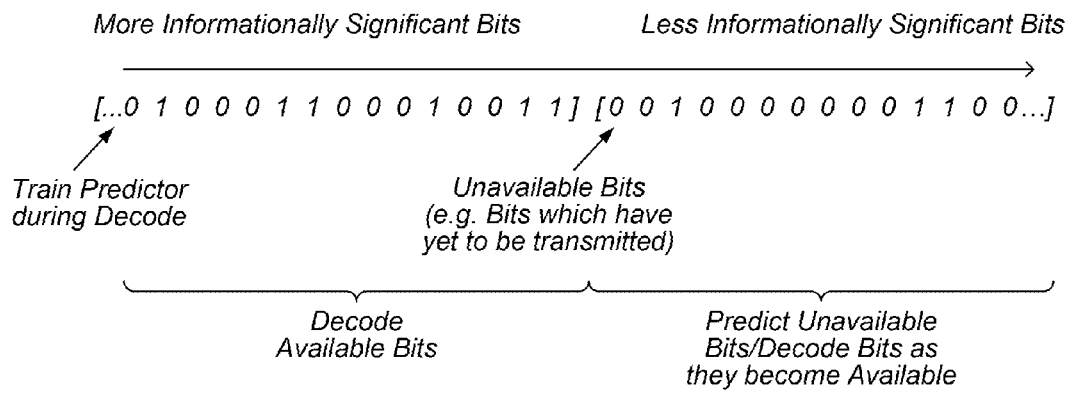
FIG. 12 is a diagram of a progressive and generative decoding scheme.

FIG. 11 is a diagram illustrating one embodiment of a progressive encoding scheme;

FIG. 12 is a diagram illustrating one embodiment of a progressive and generative decoding scheme;

Predict and Arithmetically Encode One Bit at a Time According to the Bit Structure.

Coefficient bit predictors generate local coefficient bit statistics which supply an entropy encoder for compression coding. The bit predictors may include binary suffix array descriptions of a variable-order Markov model (VMM) and may be able to predict local statistics by matching recently observed bits with sequences parsed by the VMM. In some embodiments, the SCE entropy encoder is an arithmetic-type encoder. An arithmetic-type encoder may support simultaneous compression and encryption given a long bit stream encryption key.

A prediction order may be defined for the bit types. This ordering in already specified by the bit structure (FIG. 10). Bit significance may be measured in ascending Euclidian distance from the top left corner of the bit structure. Already processed bits may be tracked so that they may be utilized for prediction while maintaining the progressive feature of the encoding scheme.

In some embodiments, predictors may be operated to supply an entropy encoder with bit statistics. As used herein, inter-block predictors (IBPs) are predictors which operate within a block. As used herein, extra-block predictors (EBPs) are predictors which operate between blocks. Specifically, IBPs analyze previously processed bits within a block to model a probability distribution for a bit in question. EBPs model previous bits in a bit significance pass (e.g. the bits of a particular significance from a coefficient of a particular type across all blocks) to model a probability distribution for the next bit in the significance pass.

In an embodiment, one IBP or EBP is employed. In certain embodiments, multiple IBPs are constructed. A "downcount predictor" (DP) may also be employed. The DP may take the histogram of a particular bit type and subtract a count from the corresponding symbol after an observation. This allows for quicker modeling of the bit probability distribution and allows the SCE encoder to perform simultaneous encryption. After each predictor generates a probability distribution for the observation of the current bit under compression, the distributions may be combined into a single distribution for use by the entropy encoder.

In one embodiment, the following predictors are used to model the probability of the current coefficient bit:

1. A parent-child predictor (PCP): A Variable order Markov model (VMM) IBP which reads already-processed parent bits, already-processed child bits, and already-processed current coefficient bits within a block to predict the current coefficient bit in the block.
2. A block predictor (BP): A VMM EBP which reads recently-processed current coefficient bits in a bit significance pass to predict the next current coefficient bit in the significance pass.
3. A downcount predictor (DP): A predictor consisting of a normalized histogram for the current coefficient bit, updated after an observation is made.

Variable order Markov models (VMMs) generate substructures which may be (or be close to) universal predictors for many encountered sequences. One application of a universal predictor (UP) is in data compression, where the predictor assigns a probability for the occurrence of a future observation based on a set of previous observations. For example, if a UP is trained on English text, after observation of the symbols _th (where the symbol "_" is used to represent the space character) the UP might predict the following letter as e with a probability of 0.90 and a with probability 0.05. Thus: a UP makes a prediction to the likelihood of a future observation in the form of a probability. Nonzero probabilities may be assigned to all other possible observations (letters and punctuation symbols in English text, 0's and 1's in our image bit structure) to account for less expected or unexpected events, and the total probabilities of all predictions must sum to 1. If the letter a is observed as the following symbol, then an entropy encoder attempts to encode a with $-\log_2 (P(a|\_th))=-\log_2 (P(0.05))=4.3219 \ldots$ bits, where $P(a|\_th)$ is the probability of observing a conditioned on the prior observations _th. If the predictions are good, then on average, the number of bits representing an encoded list of observations is less than the number of bits needed to naively encode the sequence of observations. If the number of bits is minimal, then the signal has been compressed to its entropy rate, and the compression is optimal. The more accurate a predictor is with respect to a given signal, the lower the apparent entropy rate of that signal will be.

Universal predictors dynamically generate predictions as new observations of a signal are made. To make a good prediction, the predictor learns from a set of already-observed, training data. The Laplace estimator is a simple embodiment of a universal predictor. Laplace considered the question: What is the probability that the sun will not rise tomorrow? One might think the answer is 0. But how sure can one be based solely on a limited number of previous sunrise observations? Define an alphabet of size $A=2$, consisting of binary 1 representing the occurrence of a sunrise and 0 representing the absence of a sunrise over a list of observations $x(1) \ldots x(t)$. Laplace suggested the following predictor for the future observation $x(t+1)$, where $L(i|x)$ are the predicted observation probabilities, $c(i)$ are the total counts of observed 1s or 0s, and i is a lexicographically ordered member of an alphabet of size A:

$$L(1 \mid x(1) \ldots x(t)) = \frac{c(1)+1}{t+2}$$
$$L(0 \mid x(1) \ldots x(t)) = \frac{c(0)+1}{t+2},$$

or in terms of a general alphabet:

$$L(i \mid x(1) \ldots x(t)) = \frac{c(i)+1}{t+A}.$$

Laplace gives the total observed count of each symbol an extra pseudocount of 1 to compensate for the possibility of a yet-to-be observed event occurring. In the sunrise case, as the number of sunrise counts increase, the predicted probability of a sunrise approaches 1 while the predicted probability of no morning sunrise approaches 0, just as one would expect. Therefore, the Laplace predictor is universal in the sense that for the sunrise problem the predictor converges to the optimal predictor within a bounded average error rate. (The error rate is a measurement of divergence from optimality which can be measured in probability or with the Kullback-Leibler divergence.

After a sufficient amount of training, a universal predictor may be the nearly optimal predictor for the information source it models. A class of predictors which are universal with respect to stochastic signals may conform to a specific set of statistical properties. The first is property is stationarity. For a stationary process, characteristic statistical measurements such as mean and variance remain relatively constant over time or position. The assumption is that it is safe enough to assume that a particular information source continually outputs signals of the same type and statistics.

The second property of import is ergodicity. Ergodicity indicates that observations taken over any sufficient length of an ergodic process are also sufficient for measuring the statistical properties of that process over all times. This property supports the ability of a predictor to make valid predictions after appropriate training.

The third property of import is a generalization of the Markov property, which is predicated both on stationary and on ergodicity. The Markov property asserts that a future output of stochastic process only depends on the current state of that process, or equivalently: a time series source obeying the Markov property has memory of n=1 time steps. Such a process is called a Markov chain. Specifically:

$$P(i|x(1) \ldots x(t))=P(i|x(t))$$

where P(i) is the probability of observation at time t+1. Then, if the information source is both stationary and ergodic, the output probability distribution of symbols following a specified symbol is the same after all instances of that symbol. Thus, the next state of the process is entirely dependent on the current state of the system. Therefore, a universal predictor for Markov chains is a collection of A conditional probability distributions conditioned on each possible observed symbol. The generalized Markov property states that the dependence of a subsequent observation is predicated on n previous observations for which the collection of $A^n$ conditional probability distributions is a universal predictor for an n-order Markov chain. Such a collection of conditional probability distributions is called an n-order Markov model.

n-Markov chains have the ability to better model a source where each output is not solely dependent on the previous output. Each specific n-order phrase for which a probability distribution is conditioned on is called a context. In order to generalize a Markov chain to contexts of length n>1, an alphabetic extension may be formed by taking all $A^n$ possible combinations of n symbols and treating each combination as a new, distinct symbol. Therefore, an n-Markov chain model over the alphabet A is isomorphic to an 1-Markov chain with alphabet size $A^n$. Unfortunately, because the size of the effective alphabet (which is the size of all contexts) grows exponentially with n, storage and computations involving $A^n$ contexts each associated with A conditional probabilities may become impractical for larger alphabets and all but the smallest values of n. For highly contextualizable data (data for which higher order contexts are significant), the transition matrix will be sparse, implying that the n-Markov chain model is an overly large, redundant, and inefficient description of the data.

For information sources where no a priori knowledge is available, a variable order Markov model, or VMM, may be constructed. A VMM works by constructing the minimal description (within memory limitations) of a sequence's contexts by constructing an organized list of models based on unique prefix phrases, called contexts. Each context may be an independent and identically distributed (IID) description of the observations following that phrase. Thus, in discussion of a VMM, referring to the context is the same as referencing a particular phrase's IID model.

The restriction on the prefix phrases is not in the length of the phrases (as in n-Markov chains) but rather in their uniqueness relative to other prefix phrases encountered during generation of the model. Therefore, VMMs have the capability to exploit variably short to variably long dependencies on previous output samples for generating predictions. Efficient VMMs employ context trie or tree data structures in order to store relevant prefixes with minimal memory and to facilitate searches through these prefixes. FIG. 12 provides an example of a suffix tree used for PPM prediction (specifically the PPMC variant).

Before use of a VMM for prediction, the VMM may be sufficiently constructed on training data. This involves storing the counts of observed data in the appropriate contexts either or both before compression or in online fashion, in which case the VMM updates after each new observation is made. The system described may in various embodiments utilize the former method, as it may be desired that a VMM is trained on only one class of Gleason pattern alone, and not further on query data which may or may not belong to the same class.

In some embodiments, PPM, CTW, and SM algorithms generate predictions by matching the most recently observed, active contexts from an input signal, fusing each contexts' prediction into a single probability density function (PDF) for prediction of the next observation in the input signal. For compression, the fused PDF from active contexts may be supplied to an entropy encoder for encoding each new observation.

In VMM prediction, one context exists for each memory length 0 through n. ($A''$-1" order context is available as well which defines a uniform distribution over an alphabet and need not be stored in the VMM.) A VMM predictor utilizes these contexts to construct a single, overall prediction in three fundamental ways:
1. Context Smoothing,
2. Context Weighting, and
3. Context Fusing.

Context smoothing compensates for 0-frequency estimates which have not yet been encountered in training data. The count or probability for a 0-frequency symbol within a context must be assigned a value called a pseudocount (as previously described for the Laplace estimator). Algorithms may use a pseudocount of 1 per context symbol, a pseudocount inversely proportional to the alphabet size (i.e. the Krichevsky-Trofimov estimator), or a pseudodistribution culled from other context predictions. Context weights are significance values which estimate how well a prediction from one context should perform against the others. CTW algorithms weight contexts explicitly while PPM algorithms weight (an smooth) contexts implicitly through an escape and exclude mechanism. The SM algorithm uses Bayesian estimation to weight the context predictions. Context fusing is a weighted averaging of all active contexts into a single distribution. This is achieved additively (PPM and SM) or recursively (CTW), although other methods have been offered.

Generally speaking, each of the above algorithms carries out smoothing, weighting, and fusing in a different way—often with similar results. While each step may appear independent at first glance, the weighting and fusing stages form a combination problem which asks if there is an optimal way to combine multiple estimations and predictions. The smoothing step forms what is known as the 0-frequency problem which asks how unobserved possibilities should be compensated. (The SM uses a Bayesian solution to the 0-frequency problem through use of an assumed prior distribution.)

In various embodiments of recompression algorithms described herein, a predictor is optimized for speed and not compression performance. This reduced complexity may make these predictors more suitable for data-dense media like images which require an extremely large amount of learning and prediction for bitwise compression. In some cases, out of the list of active contexts, only the highest order context is selected for prediction. The prediction is then smoothed using the Krichevsky-Trofimov estimator, adding ½ pseudocount to each observed 0 and 1 count in the context.

The maximum Markov order bounds for the PCP and BP predictors may differ significantly in the implementation. The PCP predictor uses a memory of the total number of already-processed block bits from the parent and children coefficients. To this memory is added the number of already-processed, more-significant bits from the coefficient of the bit under prediction and encoding. Thus, the memories for each coefficient bit type's PCP may have a different maximum order (in the implementation the maximum order is constrained to 16 to minimize the memory footprint of the VMM). The ordering of the context is formed from the least significant to most significant parent and children bits (as determined by the distance from the top leftmost corner in the bit structure) concatenated with the most significant to least significant already-processed bits of the coefficient of the bit under prediction and encoding. This predictor is visualized in Table 2, with the black lines representing the parent, child, and current coefficient bits for prediction of the red-colored coefficient bit. (The actual ordering of the context is not indicated by the arrows; the arrows are intended to indicate that the bits it covers are used for prediction of the bit to which they are pointing.) The BP uses a maximum Markov order bound of 5 because a point 6 steps away from an initial point in a Hilbert curve is, on average, the nearest to the initial point in Euclidean distance per number of steps. Because the block sequence is unwrapped in Hilbert curves, the BP uses the 5 previous step values to predict the current, 6th step.

Lastly, the three types of predictions from the predictors may be multiplicatively averaged. This average may present the most informationally fair average between the three. If the bit cost of symbol i from prediction A is $-\log_2(P_A(i))$, and the bit cost from predictor B is $-\log_2(P_B(i))$, then the prediction probability minimizing the tradeoff in bit cost between the two contexts is $$-\log_2(P_{avg}(i)) = \frac{-\log_2(P_A(i)) - \log_2(P_B(i))}{2}$$

$$P_{avg}(i) = 2^{\left(\frac{\log_2(P_A(i)) + \log_2(P_B(i))}{2}\right)}$$

$$P_{avg}(i) = \sqrt[2]{P_A(i)P_B(i)},$$

which is the geometric mean of the two context probabilities. The solution is multiplicative solution in that probabilities are multiplied in averaging. Thus, the lump prediction from the three recompression bit predictors is a normalized version of $$P_{recompress}(i) = \sqrt[3]{P_{PCP}(i)P_{BP}(i)P_{DP}(i)} \qquad (4)$$

$$= 2^{\left(\frac{\log_2(P_{PCP}(i)) + \log_2(P_{BP}(i)) + \log_2(P_{DP}(i))}{3}\right)}$$

for i={0, 1}. The normalized prediction is then supplied to the SCE entropy encoder for simultaneous compression and encryption.

Lossy Step: Stop Encoding when a Desired Bit Rate is Met.

If a maximum bitrate is specified, indicating that the best quality lossy compression should be obtained for a given file size, the encoder can terminate encoding once the target file size is reached. In some embodiments, this step may be omitted.

Compress and Store Scan Tree and Zero-Order Statistics.

Compression of coefficient bits depends on the formulation of the scan tree and coefficient statistics of the particular image under compression. Therefore, these data may be passed along with the compressed coefficient bits so that a decompressor may decode the coefficient bits with identical predictions and statistics. Many aspects of the scan tree are compressible, such as the correlation bits and optimal scan order (once difference coded). Coefficient statistics in the form of histograms are also compressible as their statistics will vary relatively slowly from the most significant to least significant coefficients (difference coding is appropriate here as well). Simultaneous compression and encryption of this data also secures a relatively small amount of essential information which is necessary to decode the image. In certain embodiments, final application of strong block ciphers like the computationally expensive AES algorithm may be employed.

Embodiments described herein with reference to flowchart and/or block diagram illustrations of methods, systems, devices, simulations, and computer program products may be implemented using a computer system. For instance, the flowchart and/or block diagrams further illustrate exemplary operations of the computer systems and methods of FIGS. 1 to 18. In various embodiments, each block of the flowchart and/or block diagram illustrations, and combinations of blocks in the flowchart and/or block diagram illustrations, may be implemented by any computer program instructions and/or hardware. These computer program instructions may be provided to a processor of a general purpose computer, a microprocessor, a portable device such as cell phones, a special purpose computer or device, or other programmable data processing apparatus to produce a device, such that the instructions, which execute via the processor of the computer or other programmable data processing apparatus, create means for implementing the functions specified in the flowcharts and/or block diagrams or blocks. The computer program may also be supplied from a remote source embodied in a carrier medium such as an electronic signal, including a radio frequency carrier wave or an optical carrier wave.

Figure 13:
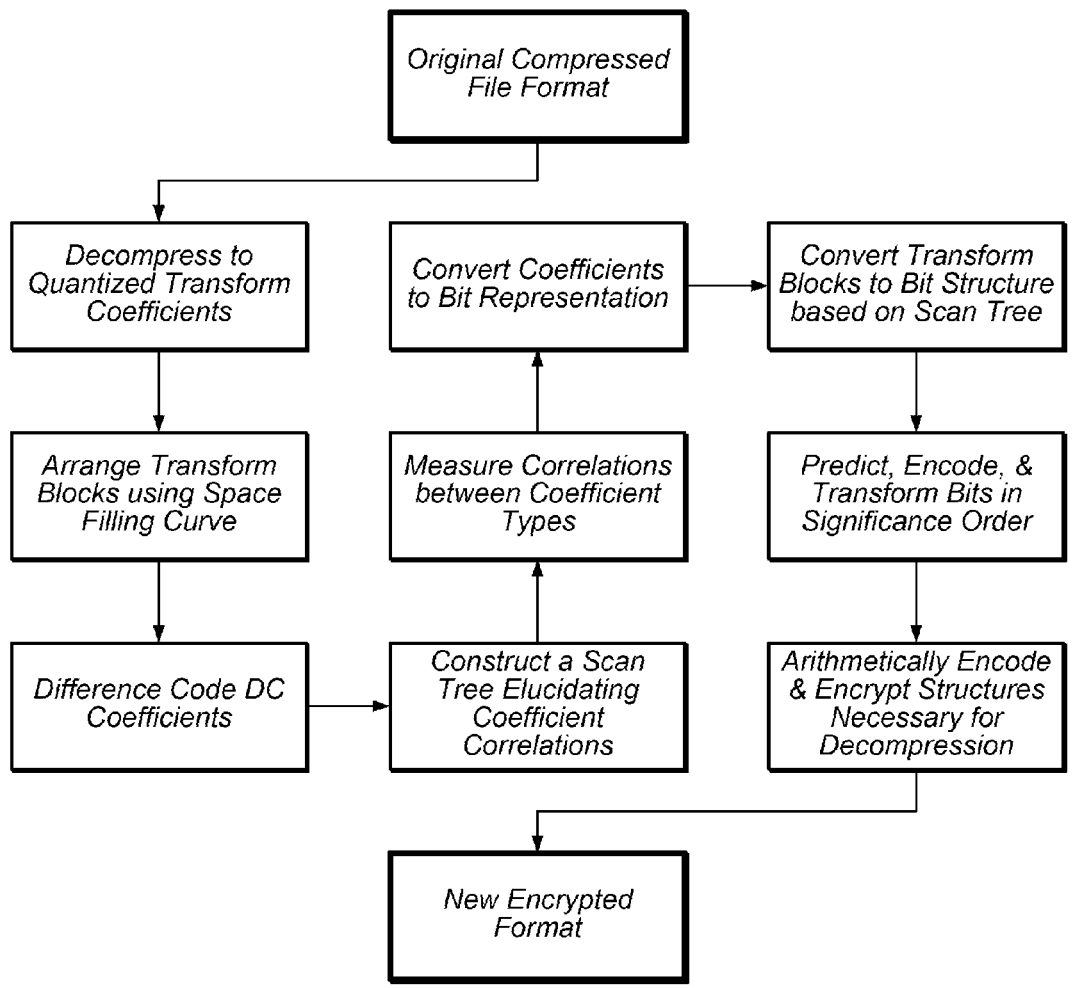
FIG. 13 is a diagram of an encryptive encoding scheme.
Figure 14:
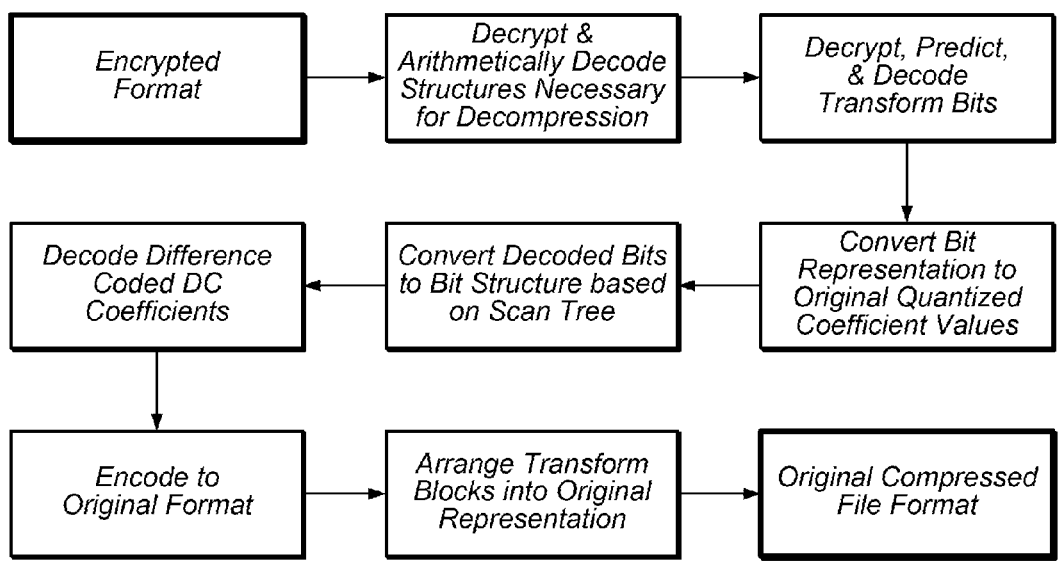
FIG. 14 is a diagram of a decrypting scheme.
Figure 15:
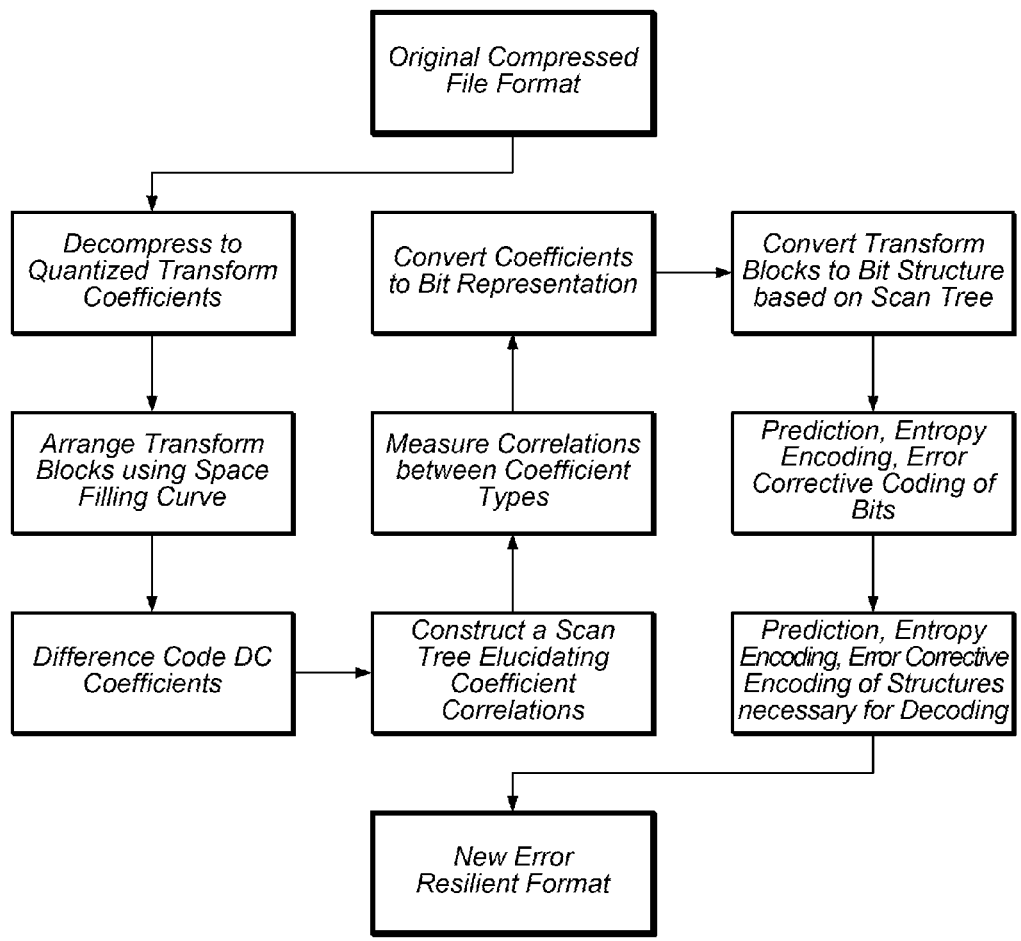
FIG. 15 is a diagram of an error correcting scheme.
Figure 16:
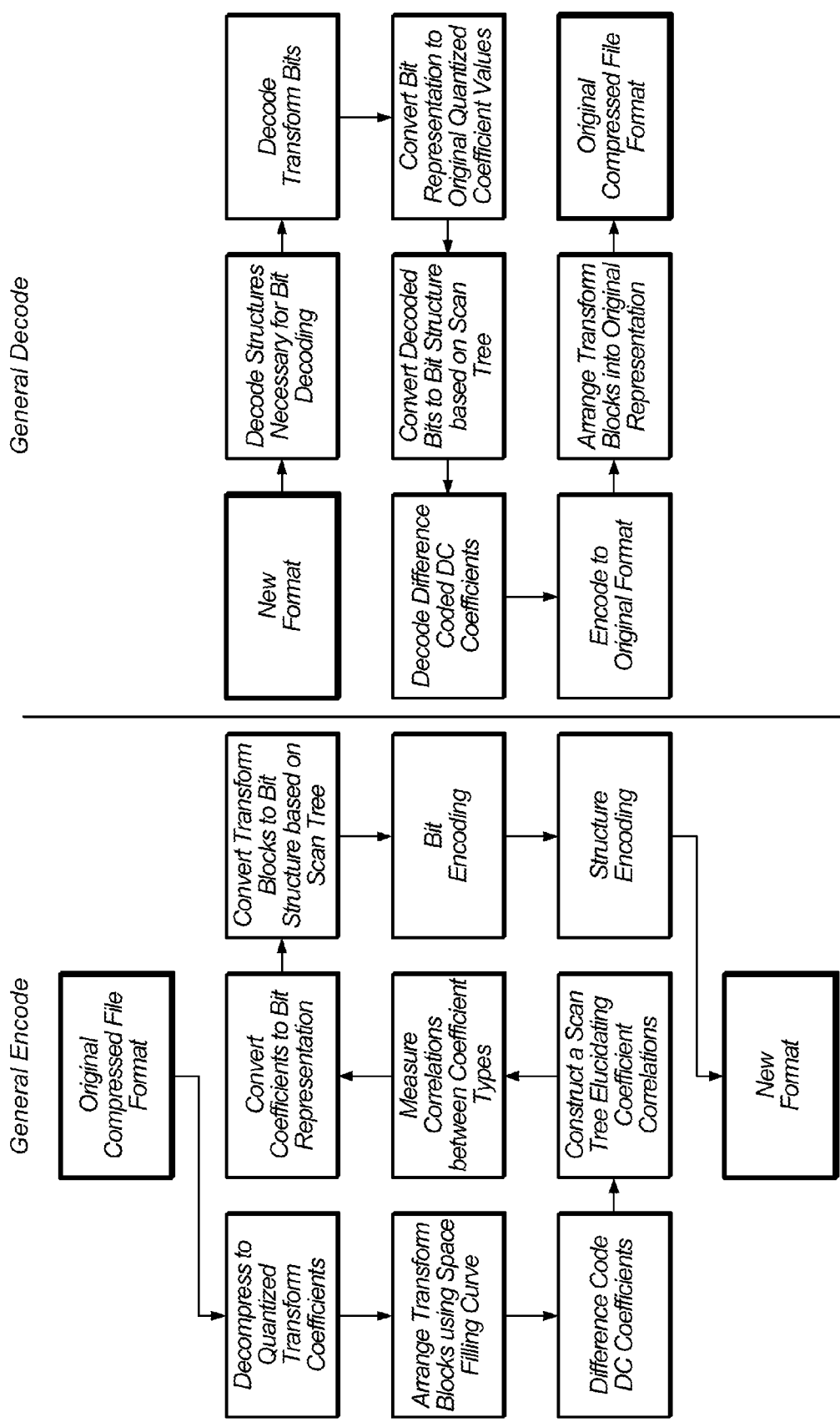
FIG. 16 is a diagram of a multipurpose encoding/decoding scheme.

Additional features in the encoding process occurring before, concurrent, or simultaneous to the entropy encoding stage include, but are not limited to, encryption and error correction. FIG. 13 is a diagram of an encryptive encoding scheme. FIG. 14 is a diagram of a decrypting scheme. FIG. 15 is a diagram of an error correcting scheme. General encoders and decoders embodying these features are illustrated in FIG. 16.

Encoding and decoding may also be carried out sequentially in order of informational significance. Such strategies can support both progressive decoding, where a lower quality representation of the original media is available from a partially decoded sequence, and generative decoding, where a higher quality representation of the original media is predicted from a partially decoded sequence.

Figure 17:
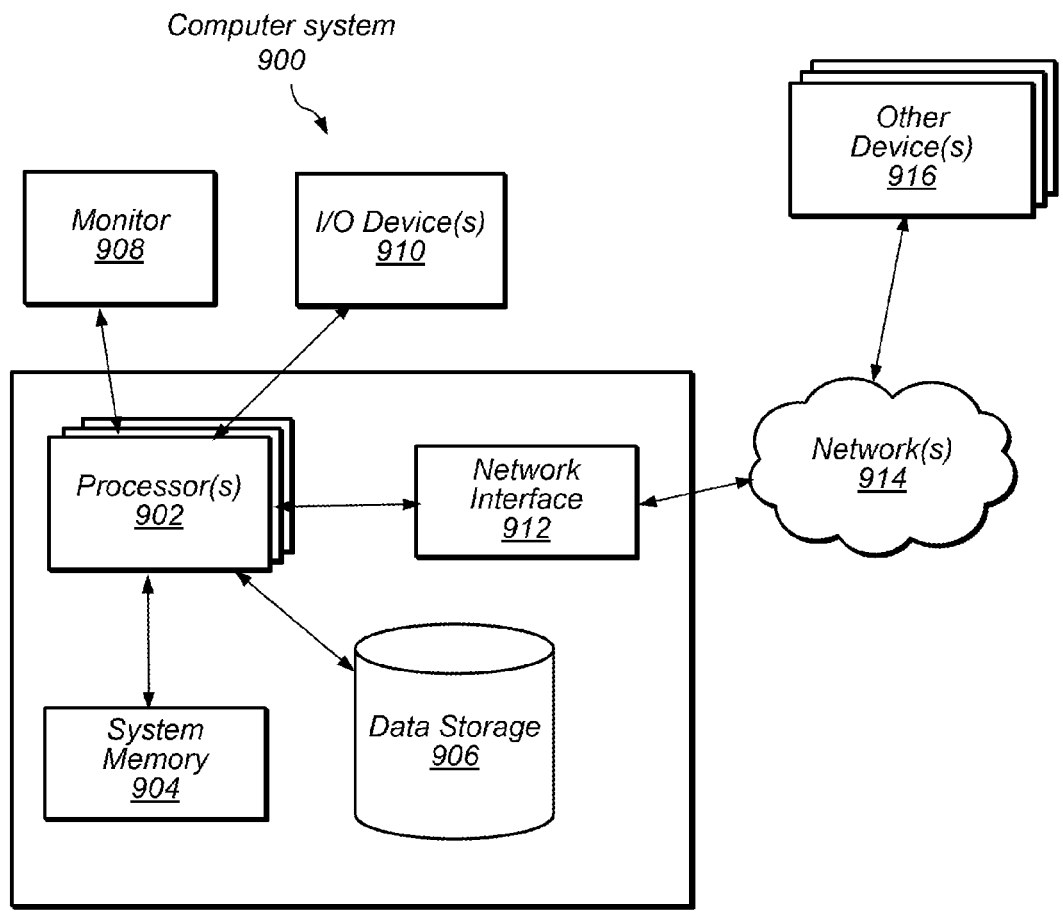
FIG. 17 illustrates a computer system that may be used to implement methods that include compressing, recompressing, decompressing, and transmitting/storing digitized media data.

FIG. 17 illustrates a computer system that may be used to implement methods that include compressing, recompressing, decompressing, and transmitting/storing digitized media data, in various embodiments. Computer system 900 includes one or more processors 902, system memory 904, and data storage device 906. Program instructions may be stored on system memory 904. Processors 902 may access program instructions on system memory 904. Processors 902 may access data storage device 906. Users may be provided with information from computer system 900 by way of monitor 908. Users interact with computer system 900 by way of I/O devices 910. An I/O device 910 may be, for example, a keyboard or a mouse. Computer system 900 may include, or connect with, other devices 916. Elements of computer system 900 may connect with other devices 916 by way of network 914 via network interface 912. Network interface 912 may be, for example, a network interface card. In some embodiments, messages are exchanged between computer system 900 and other devices 916, for example, via a transport protocol, such as internet protocol.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network. In some embodiments, a computer system at a respective participant location may include a memory medium(s) on which one or more computer programs or software components according to one embodiment may be stored. For example, the memory medium may store one or more programs that are executable to perform the methods described herein. The memory medium may also store operating system software, as well as other software for operation of the computer system.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
    transforming, by a computer system, media into a representation comprising blocks of quantized coefficients ("DCT blocks");
    computing correlation measures between quantized coefficients in the DCT blocks, wherein the correlation measures describe a degree of correlation between different quantized coefficient types, and wherein the different quantized coefficient types comprise a DC coefficient type and one or more AC coefficient types:
    constructing a scan tree of coefficients from one or more coefficient correlation measures, wherein the scan tree comprises an ordered, linked list of coefficient types linked according to the coefficient correlation measures and ordered by at least one of their mutual information and relative magnitudes;
    constructing a bit scanning structure from the scan tree; and
    encoding the data in the bit scanning structure to generate a compressed representation of the media.

2. The method of claim 1, wherein the media comprises previously compressed media.

3. The method of claim 2, wherein the previously compressed media is decoded to quantized coefficients prior to computing correlation measures between quantized coefficients in the decoded quantized coefficients of the previously compressed media.

4. The method of claim 2, wherein the previously compressed data comprises a JPEG file.

5. The method of claim 2, wherein the previously compressed data comprises a MPEG file.

6. The method of claim 1, further comprising rearranging the DCT blocks such that the DCT blocks are sorted with like coefficients placed near each other in the sorted order.

7. The method of claim 1, wherein the method further comprises difference coding adjacent DC coefficients.

8. The method of claim 1, further comprising converting the coefficients of each DCT block to a least-significant bit sign-magnitude representation.

9. The method of claim 8, wherein coefficients having a least-significant bit sign-magnitude representation of zero are discarded.

10. The method of claim 1, wherein constructing a bit scanning structure comprises using inter-block predictors, extra-block predicators, and downcount predictors.

11. The method of claim 1, further comprising compressing and storing the scan tree and the zero-order coefficient statistics for use by a decoder.

12. The method of claim 1, wherein encoding at least a portion of the media comprises lossless compression.

13. The method of claim 1, wherein encoding at least a portion of the media comprises lossy compression.

14. The method of claim 1, wherein encoding at least a portion of the coefficient data comprises encryption, decryption, or error correction.

15. A system, comprising:
    a processor/device;
    a memory coupled to the processor, wherein the memory comprises program instructions executable by the processor to implement:
    transforming, by a computer system, media into a representation comprising blocks of quantized coefficients ("DCT blocks");
    computing correlation measures between quantized coefficients in the DCT blocks, wherein the correlation measures describe a degree of correlation between different quantized coefficient types, and wherein the different quantized coefficient types comprise a DC coefficient type and one or more AC coefficient types;
    constructing a scan tree of coefficients from one or more coefficient correlation measures, wherein the scan tree comprises an ordered, linked list of coefficient types linked according to the coefficient correlation measures and ordered by at least one of their mutual information and relative magnitudes;
    constructing a bit scanning structure from the scan tree; and
    encoding the data in the bit scanning structure to generate a compressed representation of the media.

16. A non-transitory, computer-readable storage medium comprising program instructions stored thereon, wherein the program instructions are configured to implement:
- transforming, by a computer system, media into a representation comprising blocks of quantized coefficients ("DCT blocks");
- computing correlation measures between quantized coefficients in the DCT blocks, wherein the correlation measures describe a degree of correlation between different quantized coefficient types, and wherein the different quantized coefficient types comprise a DC coefficient type and one or more AC coefficient types;
- constructing a scan tree of coefficients from one or more coefficient correlation measures, wherein the scan tree comprises an ordered, linked list of coefficient types linked according to the coefficient correlation measures and ordered by at least one of their mutual information and relative magnitudes;
- constructing a bit scanning structure from the scan tree; and
- encoding the data in the bit scanning structure to generate a compressed representation of the media.

* * * * *